(12) United States Patent
Raghavan et al.

(10) Patent No.: US 6,695,741 B2
(45) Date of Patent: Feb. 24, 2004

(54) FAMILY OF FIVE-SPEED TRANSMISSION MECHANISMS HAVING THREE PLANETARY GEAR SETS

(75) Inventors: Madhusudan Raghavan, West Bloomfield, MI (US); Chunhao J. Lee, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/041,316

(22) Filed: Jan. 8, 2002

(65) Prior Publication Data

US 2003/0130080 A1 Jul. 10, 2003

(51) Int. Cl.$^7$ ................................................ F16H 3/44
(52) U.S. Cl. ...................................... 475/286; 475/275
(58) Field of Search ................................ 475/275, 278, 475/282, 286

(56) References Cited

U.S. PATENT DOCUMENTS

| | | | |
|---|---|---|---|
| 4,070,927 A | | 1/1978 | Polak ............................ 74/765 |
| 5,106,352 A | | 4/1992 | Lepelletier ................... 475/280 |
| 5,599,251 A | | 2/1997 | Beim et al. ................... 475/275 |
| 5,879,264 A | | 3/1999 | Raghavan et al. ........... 475/280 |
| 5,885,184 A | * | 3/1999 | Park ............................ 475/286 |
| 5,928,102 A | * | 7/1999 | Park ............................ 475/286 |
| 5,944,629 A | * | 8/1999 | Park ............................ 475/279 |
| 5,951,432 A | | 9/1999 | Wehking et al. ............. 475/280 |
| 5,967,935 A | * | 10/1999 | Park ............................ 475/275 |
| 5,984,825 A | | 11/1999 | Hebbale et al. .............. 475/286 |
| 5,997,429 A | | 12/1999 | Raghavan et al. ........... 475/280 |
| 6,004,241 A | * | 12/1999 | Park ............................ 475/275 |
| 6,007,450 A | | 12/1999 | Raghavan et al. ........... 475/286 |
| 6,039,670 A | * | 3/2000 | Park ............................ 475/275 |
| 6,056,665 A | | 5/2000 | Raghavan et al. ........... 475/280 |
| 6,071,208 A | | 6/2000 | Koivunen .................... 475/275 |
| 6,083,135 A | * | 7/2000 | Baldwin et al. ............. 475/276 |
| 6,425,841 B1 | * | 7/2002 | Haka |

FOREIGN PATENT DOCUMENTS

EP      1033510      9/2000

* cited by examiner

*Primary Examiner*—Dirk Wright
(74) *Attorney, Agent, or Firm*—Kathryn A. Marra

(57) ABSTRACT

The family of transmissions has a plurality of members that can be utilized in powertrains to provide at least five forward speed ratios and one reverse speed ratio. The transmission family members include three planetary gear sets, two brakes and two clutches. The powertrain includes an engine and torque converter that is continuously connected to at least one member of the planetary gear arrangement and an output member that is continuously connected with another of the planetary gear members. The two brakes and two clutches provide interconnections between various gear members and with the input, the output shaft, or the transmission housing, in some instances, and are operated in combinations of two to establish at least five forward speed ratios and a reverse speed ratio.

11 Claims, 16 Drawing Sheets

| | RATIOS | 50 | 52 | 54 | 56 |
|---|---|---|---|---|---|
| REVERSE | -2.31 | X | | X | |
| NEUTRAL | | X | | | |
| 1 | 3.64 | X | X | | |
| 2 | 2.10 | X | | | X |
| 3 | 1.33 | | X | | X |
| 4 | 1.00 | | | X | X |
| 5 | 0.67 | | X | X | |

(X = ENGAGED CLUTCH)

$\frac{\text{RING GEAR}}{\text{SUN GEAR}}$ TOOTH RATIO: $\frac{R_1}{S_1} = 3.00, \frac{R_2}{S_2} = 2.31, \frac{R_3}{S_3} = 2.00$

| RATIO SPREAD | 5.47 |
|---|---|
| RATIO STEPS | |
| REV/1 | -0.63 |
| 1/2 | 1.73 |
| 2/3 | 1.58 |
| 3/4 | 1.33 |
| 4/5 | 1.50 |

|  | RATIOS | 150 | 152 | 154 | 156 |
|---|---|---|---|---|---|
| REVERSE | -2.58 |  | X |  | X |
| NEUTRAL |  |  | X |  |  |
| 1 | 3.81 | X | X |  |  |
| 2 | 2.19 | X |  |  | X |
| 3 | 1.33 | X |  | X |  |
| 4 | 1.00 |  |  | X | X |
| 5 | 0.68 |  | X | X |  |

(X = ENGAGED CLUTCH)

$\dfrac{\text{RING GEAR}}{\text{SUN GEAR}}$ TOOTH RATIO: $\dfrac{R_1}{S_1} = 1.86$, $\dfrac{R_2}{S_2} = 3.00$, $\dfrac{R_3}{S_3} = 1.88$

| RATIO SPREAD | 5.60 |
|---|---|
| RATIO STEPS |  |
| REV/1 | -0.68 |
| 1/2 | 1.74 |
| 2/3 | 1.64 |
| 3/4 | 1.33 |
| 4/5 | 1.47 |

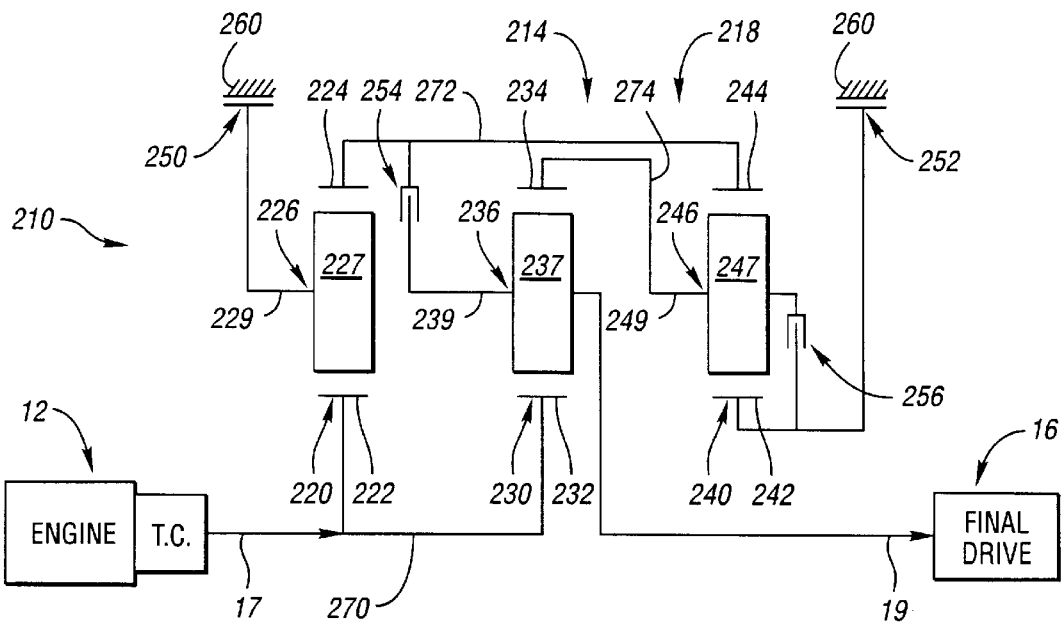
𝓕𝓲𝓰. 3𝓪
𝓕𝓲𝓰. 3𝓫
|  | RATIOS | 250 | 252 | 254 | 256 |
|---|---|---|---|---|---|
| REVERSE | -2.91 | X |  | X |  |
| NEUTRAL |  | X |  |  |  |
| 1 | 5.36 | X |  |  | X |
| 2 | 3.79 | X | X |  |  |
| 3 | 2.53 |  | X |  | X |
| 4 | 1.57 |  | X | X |  |
| 5 | 1.00 |  |  | X | X |
(X = ENGAGED CLUTCH)
$\frac{\text{RING GEAR}}{\text{SUN GEAR}}$ TOOTH RATIO: $\frac{R_1}{S_1} = 2.91$, $\frac{R_2}{S_2} = 1.53$, $\frac{R_3}{S_3} = 1.70$
| RATIO SPREAD | 5.36 |
|---|---|
| RATIO STEPS |  |
| REV/1 | -0.54 |
| 1/2 | 1.41 |
| 2/3 | 1.50 |
| 3/4 | 1.62 |
| 4/5 | 1.57 |

| | RATIOS | 350 | 352 | 354 | 356 |
|---|---|---|---|---|---|
| REVERSE | -1.91 | X | | X | |
| NEUTRAL | | X | | | |
| 1 | 3.43 | X | X | | |
| 2 | 2.45 | X | | | X |
| 3 | 1.63 | | X | | X |
| 4 | 1.00 | | | X | X |
| 5 | 0.63 | | X | X | |

(X = ENGAGED CLUTCH)

$\frac{\text{RING GEAR}}{\text{SUN GEAR}}$ TOOTH RATIO: $\frac{R_1}{S_1} = 1.91$, $\frac{R_2}{S_2} = 1.58$, $\frac{R_3}{S_3} = 1.73$

| RATIO SPREAD | 5.41 |
|---|---|
| RATIO STEPS | |
| REV/1 | -0.56 |
| 1/2 | 1.40 |
| 2/3 | 1.50 |
| 3/4 | 1.63 |
| 4/5 | 1.58 |

|  | RATIOS | 450 | 452 | 454 | 456 |
|---|---|---|---|---|---|
| REVERSE | -2.93 | X |  |  | X |
| NEUTRAL |  | X |  |  |  |
| 1 | 5.76 | X |  | X |  |
| 2 | 3.99 | X | X |  |  |
| 3 | 2.61 |  | X | X |  |
| 4 | 1.59 |  | X |  | X |
| 5 | 1.00 |  |  | X | X |

(X = ENGAGED CLUTCH)

$\frac{\text{RING GEAR}}{\text{SUN GEAR}}$ TOOTH RATIO: $\frac{R_1}{S_1} = 1.61$, $\frac{R_2}{S_2} = 2.93$, $\frac{R_3}{S_3} = 1.73$

| RATIO SPREAD | 5.76 |
|---|---|
| RATIO STEPS |  |
| REV/1 | -0.51 |
| 1/2 | 1.44 |
| 2/3 | 1.53 |
| 3/4 | 1.64 |
| 4/5 | 1.59 |

|   | RATIOS | 550 | 552 | 554 | 556 |
|---|---|---|---|---|---|
| REVERSE | -1.83 | X |   | X |   |
| NEUTRAL |   | X |   |   |   |
| 1 | 3.38 | X | X |   |   |
| 2 | 2.40 | X |   |   | X |
| 3 | 1.61 |   | X |   | X |
| 4 | 1.00 |   |   | X | X |
| 5 | 0.64 |   | X | X |   |

(X = ENGAGED CLUTCH)

$\frac{\text{RING GEAR}}{\text{SUN GEAR}}$ TOOTH RATIO: $\frac{R_1}{S_1} = 1.65$, $\frac{R_2}{S_2} = 1.83$, $\frac{R_3}{S_3} = 1.70$

| RATIO SPREAD | 5.24 |
|---|---|
| RATIO STEPS |   |
| REV/1 | -0.54 |
| 1/2 | 1.41 |
| 2/3 | 1.49 |
| 3/4 | 1.61 |
| 4/5 | 1.55 |

| | RATIOS | 650 | 652 | 654 | 656 |
|---|---|---|---|---|---|
| REVERSE | -1.39 | X | X | | |
| NEUTRAL | | | X | | |
| 1 | 2.59 | | | X | X |
| 2 | 1.51 | X | | X | |
| 3 | 1.00 | | | X | X |
| 4 | 0.73 | X | | | X |
| 5 | 0.47 | | X | | X |

(X = ENGAGED CLUTCH)

$\dfrac{\text{RING GEAR}}{\text{SUN GEAR}}$ TOOTH RATIO: $\dfrac{R_1}{S_1} = 2.74$, $\dfrac{R_2}{S_2} = 2.13$, $\dfrac{R_3}{S_3} = 1.90$

| RATIO SPREAD | 5.56 |
|---|---|
| RATIO STEPS | |
| REV/1 | -0.54 |
| 1/2 | 1.72 |
| 2/3 | 1.51 |
| 3/4 | 1.37 |
| 4/5 | 1.57 |

|  | RATIOS | 750 | 752 | 754 | 756 |
|---|---|---|---|---|---|
| REVERSE | -1.89 | X | X |  |  |
| NEUTRAL |  |  | X |  |  |
| 1 | 2.79 |  | X |  | X |
| 2 | 1.63 | X |  |  | X |
| 3 | 1.00 |  |  | X | X |
| 4 | 0.75 | X |  | X |  |
| 5 | 0.51 |  |  | X | X |

(X = ENGAGED CLUTCH)

$\frac{\text{RING GEAR}}{\text{SUN GEAR}}$ TOOTH RATIO: $\frac{R_1}{S_1} = 3.00$, $\frac{R_2}{S_2} = 2.52$, $\frac{R_3}{S_3} = 1.85$

| RATIO SPREAD | 5.45 |
|---|---|
| RATIO STEPS |  |
| REV/1 | -0.68 |
| 1/2 | 1.71 |
| 2/3 | 1.63 |
| 3/4 | 1.33 |
| 4/5 | 1.46 |

|  | RATIOS | 850 | 852 | 854 | 856 |
|---|---|---|---|---|---|
| REVERSE | -1.87 | X | X |  |  |
| NEUTRAL |  | X |  |  |  |
| 1 | 2.89 | X |  | X |  |
| 2 | 1.66 | X |  |  | X |
| 3 | 1.00 |  |  | X | X |
| 4 | 0.76 |  | X |  | X |
| 5 | 0.53 |  | X | X |  |

(X = ENGAGED CLUTCH)

$\dfrac{\text{RING GEAR}}{\text{SUN GEAR}}$ TOOTH RATIO: $\dfrac{R_1}{S_1} = 1.87$, $\dfrac{R_2}{S_2} = 1.52$, $\dfrac{R_3}{S_3} = 2.03$

| RATIO SPREAD | 5.44 |
|---|---|
| RATIO STEPS |  |
| REV/1 | -0.65 |
| 1/2 | 1.74 |
| 2/3 | 1.66 |
| 3/4 | 1.32 |
| 4/5 | 1.43 |

|  | RATIOS | 950 | 952 | 954 | 956 |
|---|---|---|---|---|---|
| REVERSE | -2.00 |  | X | X |  |
| NEUTRAL |  |  | X |  |  |
| 1 | 3.57 | X | X |  |  |
| 2 | 2.01 | X |  | X |  |
| 3 | 1.34 | X |  |  | X |
| 4 | 1.00 |  |  | X | X |
| 5 | 0.63 |  | X |  | X |

(X = ENGAGED CLUTCH)

$\frac{\text{RING GEAR}}{\text{SUN GEAR}}$ TOOTH RATIO: $\frac{R_1}{S_1} = 2.33, \frac{R_2}{S_2} = 1.67, \frac{R_3}{S_3} = 2.98$

| RATIO SPREAD | 5.66 |
|---|---|
| RATIO STEPS |  |
| REV/1 | -0.56 |
| 1/2 | 1.78 |
| 2/3 | 1.50 |
| 3/4 | 1.34 |
| 4/5 | 1.59 |

| RATIOS | | 1050 | 1052 | 1054 | 1056 |
|---|---|---|---|---|---|
| REVERSE | -6.46 | | X | | X |
| NEUTRAL | | | | | X |
| 1 | 6.73 | X | | | X |
| 2 | 3.83 | X | X | | |
| 3 | 2.20 | X | | X | |
| 4 | 1.60 | | X | X | |
| 5 | 1.00 | | | X | X |

(X = ENGAGED CLUTCH)

$\dfrac{\text{RING GEAR}}{\text{SUN GEAR}}$ TOOTH RATIO: $\dfrac{R_1}{S_1} = 2.81$, $\dfrac{R_2}{S_2} = 2.83$, $\dfrac{R_3}{S_3} = 1.73$

| RATIO SPREAD | 6.73 |
|---|---|
| RATIO STEPS | |
| REV/1 | -0.96 |
| 1/2 | 1.75 |
| 2/3 | 1.74 |
| 3/4 | 1.37 |
| 4/5 | 1.60 |

| | RATIOS | 1150 | 1152 | 1154 | 1156 |
|---|---|---|---|---|---|
| REVERSE | -2.50 | | X | X | |
| NEUTRAL | | | X | | |
| 1 | 3.75 | X | X | | |
| 2 | 2.17 | X | | X | |
| 3 | 1.34 | X | | | X |
| 4 | 1.00 | | | X | X |
| 5 | 0.68 | | X | | X |

(X = ENGAGED CLUTCH)

$\frac{\text{RING GEAR}}{\text{SUN GEAR}}$ TOOTH RATIO: $\frac{R_1}{S_1} = 2.99$, $\frac{R_2}{S_2} = 2.95$, $\frac{R_3}{S_3} = 2.50$

| RATIO SPREAD | 5.54 |
|---|---|
| RATIO STEPS | |
| REV/1 | -0.67 |
| 1/2 | 1.73 |
| 2/3 | 1.63 |
| 3/4 | 1.34 |
| 4/5 | 1.47 |

| | RATIOS | 1250 | 1252 | 1254 | 1256 |
|---|---|---|---|---|---|
| REVERSE | -1.83 | X | | X | |
| NEUTRAL | | X | | | |
| 1 | 3.59 | X | X | | |
| 2 | 2.23 | | X | X | |
| 3 | 1.43 | | X | | X |
| 4 | 1.00 | | | X | X |
| 5 | 0.66 | X | | | X |

(X = ENGAGED CLUTCH)

$\dfrac{\text{RING GEAR}}{\text{SUN GEAR}}$ TOOTH RATIO: $\dfrac{R_1}{S_1} = 2.99,\ \dfrac{R_2}{S_2} = 2.83,\ \dfrac{R_3}{S_3} = 2.30$

| RATIO SPREAD | 5.45 |
|---|---|
| RATIO STEPS | |
| REV/1 | -0.51 |
| 1/2 | 1.61 |
| 2/3 | 1.56 |
| 3/4 | 1.43 |
| 4/5 | 1.52 |

|  | RATIOS | 1350 | 1352 | 1354 | 1356 |
|---|---|---|---|---|---|
| REVERSE | -1.91 | X |  | X |  |
| NEUTRAL |  | X |  |  |  |
| 1 | 3.43 | X | X |  |  |
| 2 | 2.45 | X |  |  | X |
| 3 | 1.63 |  | X |  | X |
| 4 | 1.00 |  |  | X | X |
| 5 | 0.63 |  | X | X |  |

(X = ENGAGED CLUTCH)

$\frac{\text{RING GEAR}}{\text{SUN GEAR}}$ TOOTH RATIO: $\frac{R_1}{S_1} = 2.91$, $\frac{R_2}{S_2} = 1.58$, $\frac{R_3}{S_3} = 1.73$

| RATIO SPREAD | 5.41 |
|---|---|
| RATIO STEPS |  |
| REV/1 | -0.56 |
| 1/2 | 1.40 |
| 2/3 | 1.50 |
| 3/4 | 1.63 |
| 4/5 | 1.58 |

| | RATIOS | 1450 | 1452 | 1454 | 1456 |
|---|---|---|---|---|---|
| REVERSE | -1.93 | X | | | X |
| NEUTRAL | | X | | | |
| 1 | 3.53 | X | X | | |
| 2 | 2.09 | | X | | X |
| 3 | 1.37 | | X | X | |
| 4 | 1.00 | | | X | X |
| 5 | 0.65 | X | | X | |

(X = ENGAGED CLUTCH)

$\dfrac{\text{RING GEAR}}{\text{SUN GEAR}}$ TOOTH RATIO: $\dfrac{R_1}{S_1} = 2.99$, $\dfrac{R_2}{S_2} = 1.83$, $\dfrac{R_3}{S_3} = 2.70$

| RATIO SPREAD | 5.46 |
|---|---|
| RATIO STEPS | |
| REV/1 | -0.55 |
| 1/2 | 1.69 |
| 2/3 | 1.52 |
| 3/4 | 1.37 |
| 4/5 | 1.55 |

|  | RATIOS | 1550 | 1552 | 1554 | 1556 |
|---|---|---|---|---|---|
| REVERSE | -1.85 |  | X |  | X |
| NEUTRAL |  |  | X |  |  |
| 1 | 3.39 | X | X |  |  |
| 2 | 1.95 |  | X | X |  |
| 3 | 1.33 | X |  | X |  |
| 4 | 1.00 |  |  | X | X |
| 5 | 0.63 | X |  |  | X |

(X = ENGAGED CLUTCH)

$\frac{\text{RING GEAR}}{\text{SUN GEAR}}$ TOOTH RATIO: $\frac{R_1}{S_1} = 2.34$, $\frac{R_2}{S_2} = 3.00$, $\frac{R_3}{S_3} = 1.85$

| RATIO SPREAD | 5.37 |
|---|---|
| RATIO STEPS |  |
| REV/1 | -0.55 |
| 1/2 | 1.74 |
| 2/3 | 1.46 |
| 3/4 | 1.33 |
| 4/5 | 1.58 |

FAMILY OF FIVE-SPEED TRANSMISSION MECHANISMS HAVING THREE PLANETARY GEAR SETS

BACKGROUND OF THE INVENTION

1. Field of the Invention

The present invention relates to a family of power transmissions having three planetary gear sets that are controlled by two clutches and two brakes to provide at least five forward speed ratios and one reverse speed ratio.

2. Background Art

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. Five-speed transmissions are disclosed in U.S. Pat. Nos. 5,879,264; 5,984,825; 5,997,429; 6,007,450; and 6,056,665 issued to Raghavan, Hebbale and Usoro on Mar. 9, 1999; Nov. 16, 1999; Dec. 7, 1999; Dec. 28, 1999 and May 2, 2000, respectively; and U.S. Pat. No. 5,951,432 issued to Wehking, Hebbale, Raghavan and Usoro on Sep. 14, 1999. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Five-speed transmissions offer several advantages over four speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Raghavan, Hebbale, Usoro and Wehking patents employ two planetary gear sets, and five or six torque transmitting mechanisms to provide five forward speeds.

SUMMARY OF THE INVENTION

It is an object of the present invention to provide an improved family of transmissions having three planetary gear sets controlled to provide at least five forward speed ratios.

In one aspect of the present invention, the family of transmissions has three planetary gear sets, each of which includes a first, second and third member, which members may comprise a sun gear, a ring gear, or a planet carrier assembly member.

In another aspect of the present invention, each of the planetary gear sets may be of the single pinion-type or of the double pinion-type.

In yet another aspect of the present invention, a first interconnecting member continuously interconnects the first member of the first planetary gear set with the first member of the second planetary gear set.

In still another aspect of the invention, a second interconnecting member continuously interconnects the second member of the first planetary gear set with the first member of the third planetary gear set.

In another aspect of the invention, a third interconnecting member continuously interconnects the second member of the second planetary gear set with the second member of the third planetary gear set.

In yet a further aspect of the invention, each family member incorporates an input shaft which is continuously interconnected with a member of the first, second or third planetary gear set, and an output shaft which is continuously connected with another member of the first, second or third planetary gear set.

In another aspect of the invention, a first brake selectively interconnects a member of the first, second or third planetary gear set, or one of the first, second and third interconnecting members with the transmission housing.

In still a further aspect of the invention, a second brake selectively interconnects a member of the first or third planetary gear set with a transmission housing.

In a still further aspect of the invention, a first clutch selectively interconnects a member of the first or second planetary gear set or one of the first, second and third interconnecting members with the input shaft, the output shaft, or another member of the first, second or third planetary gear set.

In a still further aspect of the invention, a second clutch selectively interconnects a member of the first, second, or third planetary gear set with another member of the first, second, or third planetary gear set.

In still another aspect of the invention, the two brakes and two clutches are selectively engageable in combinations of two to yield at least five forward speed ratios and one reverse speed ratio.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart of some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention;

FIG. 12b is a truth table and chart depicting some of the operating characteristics of the powertrain shown in FIG. 12a;

FIG. 13a is a schematic representation of a powertrain having a planetary transmission incorporating another family member of the present invention;

FIG. 13b is a truth table and chart depicting some of the operating characteristics of the powertrain shown in FIG. 13a;

FIG. 14a is a schematic representation of a powertrain having a planetary transmission incorporating another family member of the present invention;

FIG. 14b is a truth table and chart depicting some of the operating characteristics of the powertrain shown in FIG. 14a;

FIG. 15a is a schematic representation of a powertrain having a planetary transmission incorporating another family member of the present invention;

FIG. 15b is a truth table and chart depicting some of the operating characteristics of the powertrain shown in FIG. 15a;

FIG. 16a is a schematic representation of a powertrain having a planetary transmission incorporating another family member of the present invention; and FIG. 16b is a truth table and chart depicting some of the operating characteristics of the powertrain shown in FIG. 16a.

DETAILED DESCRIPTION OF THE PREFERRED EMBODIMENTS

Figures 1A, 1B:
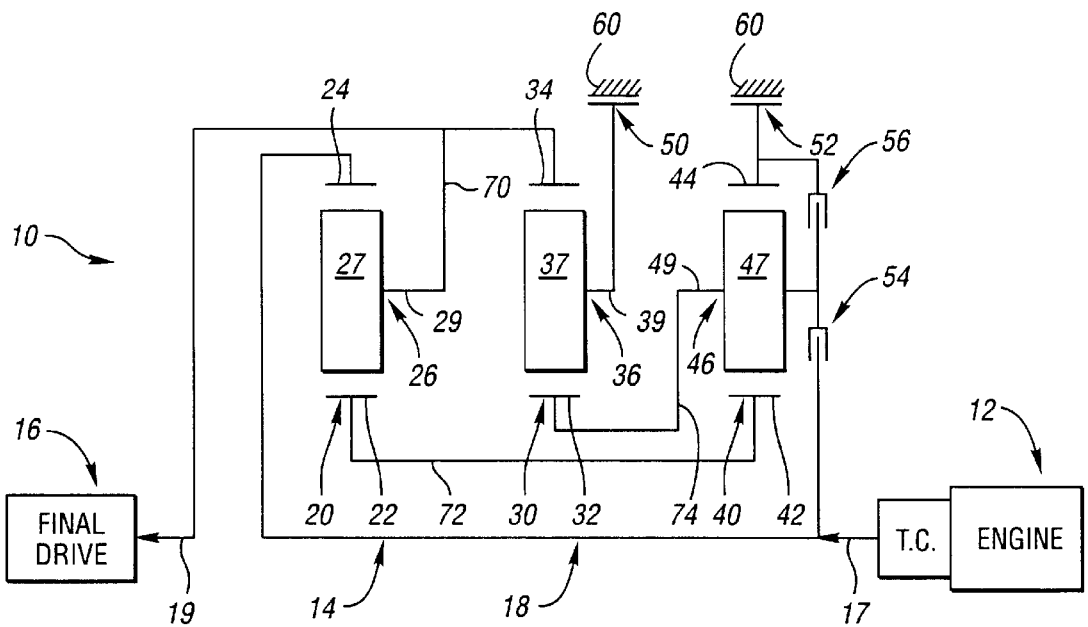

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement 18 also includes four torque transmitting mechanisms 50, 52, 54 and 56. The torque-transmitting mechanisms 50 and 52 are stationary-type torque-transmitting mechanisms, commonly termed brakes or reaction clutches. The torque transmitting mechanisms 54 and 56 are of the rotating type torque transmitting mechanisms, commonly termed clutches.

The input shaft 17 is continuously connected with the ring gear member 24, and the output shaft 19 is continuously connected with the ring gear member 34. A first interconnecting member 70 continuously interconnects the planet carrier assembly member 26 with the ring gear member 34. A second interconnecting member 72 continuously interconnects the sun gear member 22 with the sun gear member 42. A third interconnecting member 74 continuously connects the sun gear member 32 with the planet carrier assembly member 46.

The planet carrier assembly member 36 is selectively connectable with the transmission housing 60 through the brake 50. The ring gear member 44 is selectively connectable with the transmission housing 60 through the brake 52. The ring gear member 24 is selectively connectable with the planet carrier assembly member 46 through the clutch 54. The planet carrier assembly member 46 is selectively connectable with the ring gear member 44 through the clutch 56.

As shown in FIG. 1b, and in particular the truth table disclosed therein, the torque-transmitting mechanisms are selectively engaged in combinations of two to provide five forward speed ratios and one reverse speed ratio. It should also be noted in the truth table that the torque-transmitting mechanism 50 remains engaged through a neutral condition, thereby simplifying the forward/reverse interchange.

To establish the reverse speed ratio, the brake 50 and clutch 54 are engaged. The engagement of the brake 50 secures the planet carrier assembly member 36 to the transmission housing 60, and the clutch 54 secures the planet carrier assembly member 46 to the ring gear member 24. The planet carrier assembly member 26 and the ring gear member 34 rotate at the same speed as the output shaft. The planet carrier assembly member 36 does not rotate. The sun gear member 32 rotates at the same speed as the planet carrier assembly member 46, the ring gear member 24, and the input shaft 17. The speed of the ring gear member 34, and therefore the output shaft speed, is determined by the speed of the sun gear member 32 and the ring gear/sun gear tooth ratio of the planetary gear set 30. The overall numerical value of the reverse speed ratio is determined by the ring gear/sun gear tooth ratio of the planetary gear set 30.

The first forward speed ratio is established with the engagement of the brakes 50 and 52. With the brake 50 engaged, the planet carrier assembly member 36 is fixed to the transmission housing 60. The brake 52 connects the ring gear member 44 to the transmission housing 60. The planet carrier assembly member 26 and ring gear member 34 rotate at the same speed as the output shaft. This speed is determined by the speed of the ring gear member 24, which is the same as the input shaft speed, the speed of the sun gear member 22, and the ring gear/sun gear tooth ratio of the planetary gear set 20. The sun gear member 32 rotates at the same speed as planet carrier assembly member 46. The planet carrier assembly member 36 does not rotate. The speed of the ring gear member 34 is determined by the speed of the sun gear member 32 and the ring gear/sun gear tooth ratio of the planetary gear set 30. The sun gear member 42 rotates as the same speed as the sun gear member 22. The ring gear member 44 does not rotate. The planet carrier assembly member 46 rotates at a speed determined by the speed of the sun gear member 42 and the ring gear/sun gear tooth ratio of the planetary gear set 40. The overall numerical value of the first forward speed ratio is determined by the tooth ratios of the planetary sets 20, 30 and 40.

The second forward speed ratio is established with the engagement of the brake 50 and the clutch 56. The brake 50 connects the planet carrier assembly member 36 to the transmission housing 60, and the clutch 56 connects the planet carrier assembly member 46 to the ring gear member 44. The planet carrier assembly member 26 rotates at the same speed as the ring gear member 34 and the output shaft 19. This speed is determined by the speed of the ring gear member 24, which is the same as the input shaft speed, the speed of the sun gear member 22, and the ring gear/sun gear tooth ratio of the planetary gear set 20. The planet carrier assembly member 36 does not rotate. The planet carrier assembly member 46 rotates at the same speed as the sun gear member 32 and the ring gear member 44. The sun gear member 42 rotates at the same speed as the sun gear member 22, the ring gear member 44, and the planet carrier assembly member 46. The overall numerical value of the second forward speed ratio is determined by the ring gear/sun gear tooth ratios of the planetary gear sets 20 and 30.

The third forward speed ratio is established with the engagement of the brake 52 and the clutch 56. The brake 52 connects the ring gear member 44 to the transmission housing 60, and the clutch 56 connects the planet carrier assembly member 46 to the ring gear member 44. In this connection, the planetary gear set 40 stays stationary. The ring gear member 24 rotates at the same speed as the input shaft 17, and the planet carrier assembly member 26 rotates at the same speed as the output shaft and the ring gear member 34. The sun gear member 22 is connected to the sun gear member 42 and does not rotate. The speed of the planet carrier assembly member 26, and therefore the output shaft speed, is determined by the speed of the ring gear member 24, the speed of the sun gear member 22, and the ring gear/sun gear tooth ratio of the planetary gear set 20. The overall numerical value of the third forward speed ratio is determined by the tooth ratio of the planetary gear set 20.

The fourth forward speed ratio is established with the engagement of the clutches 54 and 56. The clutch 54 connects the planet carrier assembly member 46 with the ring gear member 24, and the clutch 56 connects the planet carrier assembly member 46 with the ring gear member 44. In this configuration, the input shaft 17 is directly connected to the output shaft 19. The numerical value of the fourth forward speed ratio is 1.

The fifth forward speed ratio is established with the engagement of the brake 52 and the clutch 54. The brake 52 connects the ring gear member 44 to the transmission housing 60, and the clutch 54 connects the planet carrier assembly member 46 to the ring gear member 24. The ring gear member 24 rotates at the same speed as the input shaft 17, the planet carrier assembly member 46, and the sun gear member 32; the sun gear member 22 rotates at the same speed as the sun gear member 42; and the planet carrier assembly member 26 rotates at the same speed as the output shaft. The speed of the planet carrier assembly 26 can be determined from the speed of the ring gear member 24, the speed of the sun gear member 22, and the ring gear/sun gear tooth ratio of the planetary gear set 20. The ring gear member 44 does not rotate. The planet carrier assembly member 46 rotates at a speed determined by the speed of the sun gear member 42 and the ring gear/sun gear tooth ratio of the planetary gear set 40. The overall numerical value of the fifth forward speed ratio is determined by the tooth ratios of the planetary gear sets 20 and 40.

As set forth above, the engagement schedules for the torque-transmitting mechanisms are shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward ratios is 1.73, while the step ratio between the reverse and first forward ratio is −0.63. It can also be readily determined from the truth table of FIG. 1b that all of the single step forward ratio interchanges are of the single transition variety, as are the double step forward ratio interchanges.

Figures 2A, 2B:
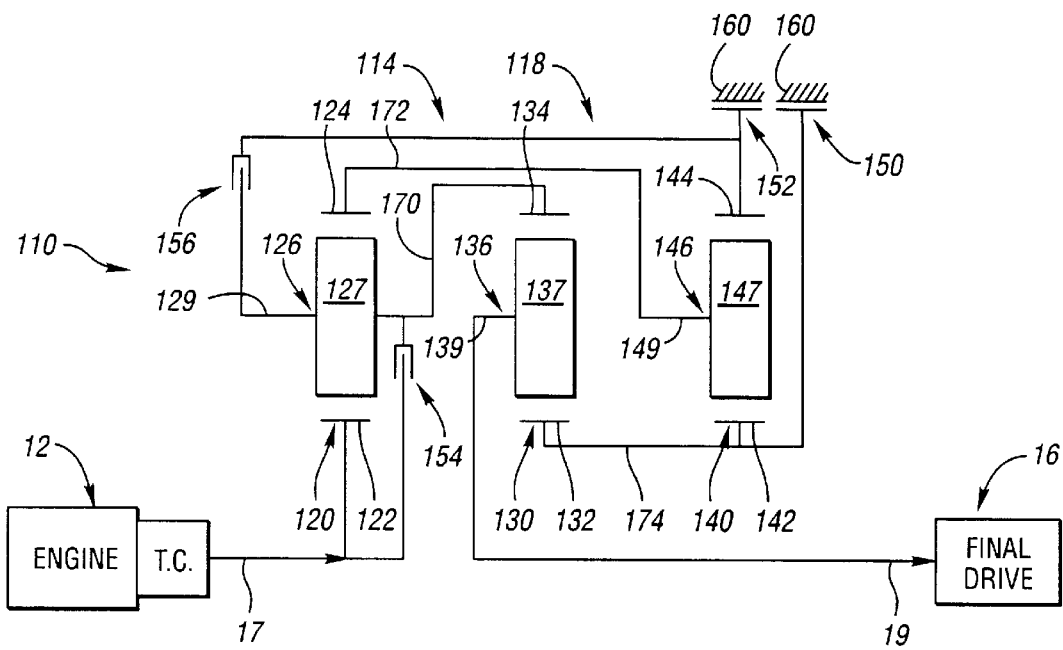

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes four torque transmitting mechanisms 150, 152, 154 and 156. The torque-transmitting mechanisms 150 and 152 are stationary-type torque-transmission mechanisms, commonly termed brakes or reaction clutches. The torque transmitting mechanisms 154 and 156 are of the rotating type torque transmitting mechanisms, commonly termed clutches.

The input shaft 17 is continuously connected with the sun gear member 122, and the output shaft 19 is continuously connected with the planet carrier assembly member 136. The planet carrier assembly member 126 is continuously connected with the ring gear member 134 through the interconnecting member 170. The ring gear member 124 is continuously connected with the planet carrier assembly member 146 through the interconnecting member 172. The sun gear member 132 is continuously connected with the sun gear member 142 through the interconnecting member 174.

The sun gear member 142 is selectively connectable with the transmission housing 160 through the brake 150. The ring gear member 144 is selectively connectable with the transmission housing 160 through the brake 152. The sun gear member 122 is selectively connectable with the planet carrier assembly member 126 through the clutch 154. The planet carrier assembly member 126 is selectively connectable with the ring gear member 144 through the clutch 156.

The truth table of FIG. 2b describes the engagement sequence utilized to provide five forward speed ratios and a reverse speed ratio in the planetary gear arrangement 118 shown in FIG. 2a.

To establish the reverse speed ratio, the brake 152 and clutch 156 are engaged. The brake 152 connects the ring gear member 144 to the transmission housing 160, and the clutch 156 connects the planet carrier assembly member 126 to the ring gear member 144. The ring gear member 124 rotates at the same speed as the planet carrier assembly member 146. The sun gear member 122 rotates at the same speed as the input shaft 17. The planet carrier assembly member 126 and ring gear members 134, 144 do not rotate. The ring gear member 124 rotates at a speed determined by the speed of the sun gear member 122 and the ring gear/sun gear member tooth ratio of the planetary gear set 120. The sun gear member 132 rotates at the same speed as the sun gear member 142. The planet carrier assembly member 136 rotates at the same speed as the output shaft 19. The speed of the planet carrier assembly member 136 is determined by the speed of the sun gear member 132 and the ring gear/sun gear tooth ratio of the planetary gear set 130. The planet carrier assembly member 146 rotates at a speed determined by the speed of the sun gear member 142 and the ring gear/sun gear tooth ratio of the planetary gear set 140. The overall numerical value of the reverse speed ratio is determined from the tooth ratios of the planetary gear sets 120, 130 and 140.

The first forward speed ratio is established with the engagement of the brakes 150 and 152. The brake 150 connects the sun gear member 142 to the transmission housing 160, and the brake 152 connects the ring gear member 144 to the transmission housing 160. The ring gear member 124, sun gear member 132, and planetary gear set 140 do not rotate. The sun gear member 122 rotates at the same speed as the input shaft 17. The planet carrier assembly member 126 rotates at the same speed as the ring gear member 134. The planet carrier assembly member 126 rotates at a speed determined by the speed of the sun gear member 122 and the ring gear/sun gear tooth ratio of the planetary gear set 120. The planet carrier assembly member 136 rotates at the same speed as the output shaft 19. The speed of the planet carrier assembly member 136 is determined from the speed of the ring gear member 134 and the ring gear/sun tooth ratio of the planetary gear set 140. The overall numerical value of the first forward speed ratio is determined by the tooth ratios of the planetary sets 120 and 130.

The second forward speed ratio is established with the engagement of the brake 150 and the clutch 156. The brake 150 connects the sun gear member 142 to the transmission housing 160, and the clutch 156 connects the planet carrier assembly member 126 to the ring gear member 144. The ring gear member 124 rotates at the same speed as the planet carrier assembly member 146. The sun gear member 122 rotates at the same speed as the input shaft 17. The planet carrier assembly member 126 rotates at the same speed as the ring gear members 134 and 144. The speed of the planet carrier assembly member 126 is determined from the speed of the ring gear member 124, the speed of the sun gear member 122, and the ring gear/sun tooth ratio of the planetary gear set 120. The sun gear members 132 and 142 do not rotate. The planet carrier assembly member 136 rotates at the same speed as the output shaft 19. The speed of the planet carrier assembly member 136 is determined from the speed of the ring gear member 134 and the ring gear/sun gear tooth ratio of the planetary gear set 130. The speed of the planet carrier assembly member 146 is determined from the speed of the ring gear member 144 and the ring gear/sun gear tooth ratio of the planetary gear set 140. The overall numerical value of the second forward speed ratio is determined by the tooth ratios of the planetary sets 120, 130 and 140.

To establish the third forward speed ratio, the brake 150 and clutch 154 are engaged. The brake 150 connects the sun gear member 142 to the transmission housing 160, and the clutch 154 connects the sun gear member 122 to the planet carrier assembly member 126. The planet carrier assembly members 126 and 146 rotate at the same speed as the sun gear member 122, the input shaft 17, and the ring gear members 124 and 134. The sun gear member 132 does not rotate. The planet carrier assembly member 136 rotates at the same speed as the output shaft 19. The speed of the planet carrier assembly member 136 is determined from the speed of the ring gear member 134 and the ring gear/sun gear tooth ratio of the planetary gear set 130. The overall numerical value of the third forward speed ratio is determined from the tooth ratio of the planetary set 130.

The fourth forward speed ratio is established with the engagement of the clutches 154 and 156. In this configuration, the input shaft 17 is directly connected with the output shaft 19. The overall numerical value of the fourth forward speed ratio is 1.

The fifth forward speed ratio is established with the engagement of the brake 152 and the clutch 154. The brake 152 connects the ring gear member 144 with the transmission housing 160, and the clutch 154 connects the sun gear member 122 with the planet carrier assembly member 126. The planet carrier assembly members 126 and 146 rotate at the same speed as the sun gear member 122, the input shaft 17, and the ring gear members 124 and 134. The sun gear member 132 rotates at the same speed as the sun gear member 142. The planet carrier assembly member 136 rotates at the same speed as the output shaft 19. The speed of the planet carrier assembly member 136 is determined from the speed of the ring gear member 134, the speed of the sun gear member 132, and the ring gear/sun gear tooth ratio of the planetary gear set 130. The ring gear member 144 does not rotate. The speed of the planet carrier assembly member 146 is determined from the speed of the sun gear member 142, and the ring gear/sun gear tooth ratio of the planetary gear set 140. The overall numerical value of the fifth forward speed ratio is determined from the tooth ratios of the planetary gear sets 130 and 140.

As set forth above, the truth table of FIG. 2b describes the engagement sequence of the torque transmitting mechanisms utilized to provide a reverse drive ratio and five forward speed ratios. It can be readily determined from the truth table that all the single step forward interchanges are of the single transition type, as are the double step forward interchanges. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step. For example, the first to second step ratio is 1.74.

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes four torque transmitting mechanisms 250, 252, 254 and 256. The torque-transmitting mechanisms 250 and 252 are stationary-type torque-transmitting mechanisms, commonly termed brakes or reaction clutches. The torque transmitting mechanisms 254 and 256 are of the rotating type torque transmitting mechanisms, commonly termed clutches.

The input shaft 17 is continuously connected with the sun gear member 222, and the output shaft 19 is continuously connected with the planet carrier assembly member 236. The sun gear member 222 is continuously connected with the sun gear member 232 through the interconnecting member 270. The ring gear member 224 is continuously connected with the ring gear member 244 through the interconnecting member 272. The ring gear member 234 is continuously connected with the planet carrier assembly member 246 through the interconnecting member 274.

The planet carrier assembly member 226 is selectively connectable with the transmission housing 260 through the brake 250. The sun gear member 242 is selectively connectable with the transmission housing 260 through the brake 252. The ring gear member 224 is selectively connectable with the planet carrier assembly member 236 through the clutch 254. The sun gear member 242 is selectively connectable with the planet carrier assembly member 246 through the clutch 256.

As shown in the truth table in FIG. 3b, the torque transmitting mechanisms are engaged in combinations of two to establish five forward speed ratios and one reverse ratio. It should be also noted that the torque transmitting mechanism 250 can remain engaged through the neutral condition, thereby simplifying the forward/reverse interchange.

To establish the reverse speed ratio, the brake 250 and clutch 254 are engaged. The brake 250 connects the planet carrier assembly member 226 with the transmission housing 260, and the clutch 254 connects the ring gear member 224 with the planet carrier assembly member 236. The planet carrier assembly member 226 does not rotate. The ring gear member 224 rotates at the same speed as the ring gear member 244, the planet carrier assembly member 236, and the output shaft 19. The sun gear member 222 rotates at the same speed as the input shaft 17 and the sun gear member 232. The speed of the ring gear member 224 is determined from the speed of the sun gear member 222 and the ring gear/sun gear tooth ratio of the planetary gear set 220. The overall numerical value of the reverse speed ratio is determined from the tooth ratio of the planetary gear set 220.

The first forward speed ratio is established with the engagement of the brake 250 and clutch 256. The brake 250 connects the planet carrier assembly member 226 with the transmission housing 260, and the clutch 256 connects the sun gear member 242 with the planet carrier assembly member 246. The ring gear member 224 rotates at the same speed as the ring gear member 244. The sun gear member 222 rotates at the same speed as the input shaft 17 and the sun gear member 232. The planet carrier assembly member 226 does not rotate. The speed of the ring gear member 224 is determined from the speed of the sun gear member 222 and the ring gear/sun gear tooth ratio of the planetary gear set 220. The ring gear members 234 and 244 rotate at the same speed as the planet carrier assembly member 246 and the sun gear member 242. The planet carrier assembly member 236 rotates at the same speed as the output shaft 19. The planet carrier assembly member 236 rotates at a speed determined by the speed of the ring gear member 234, the speed of the sun gear member 232, and the ring gear/sun gear tooth ratio of the planetary gear set 230. The overall numerical value of the first forward speed ratio is determined from the tooth ratios of the planetary gear sets 220 and 230.

The second forward speed ratio is established with the engagement of the brakes 250 and 252. The brake 250 connects the planet carrier assembly member 226 with the transmission housing 260. The brake 252 connects the sun gear member 242 with the transmission housing 260. The ring gear member 224 rotates at the same speed as the ring gear member 244. The sun gear member 222 rotates at the same speed as the input shaft 17 and the sun gear member 232. The planet carrier assembly member 226 does not rotate. The ring gear member 224 rotates at a speed determined by the speed of the sun gear member 222 and the ring gear/sun gear tooth ratio of the planetary gear set 220. The ring gear member 234 rotates at the same speed as the planet carrier assembly member 246. The planet carrier assembly member 236 rotates at the same speed as the output shaft 19, which speed is determined by the speed of the ring gear member 234, the speed of the sun gear member 232, and the ring gear/sun gear tooth ratio of the planetary gear set 230. The sun gear 242 does not rotate. The speed of the planet carrier assembly member 246 is determined from the speed of the ring gear member 244 and the ring gear/sun gear tooth ratio of the planetary gear set 240. The overall numerical value of the second forward speed ratio is determined from the tooth ratios of the planetary gear sets 220, 230 and 240.

The third forward speed ratio is established with the engagement of the brake 252 and the clutch 256. The brake 252 connects the sun gear member 242 with the transmission housing 260. The clutch 256 connects the sun gear member 242 with the planet carrier assembly member 246. Accordingly, the ring gear members 224, 234, and 244, planet carrier assembly member 246 and sun gear member 242 do not rotate. The sun gear member 232 rotates at the same speed as the sun gear member 222 and the input shaft 17. The planet carrier assembly member 236 rotates at the same speed as the output shaft 19. The planet carrier assembly member 236 rotates at a speed determined by the speed of the sun gear member 232 and the ring gear/sun gear tooth ratio of the planetary gear set 230. The overall numerical value of the third forward speed ratio is determined from the tooth ratio of the planetary gear set 230.

The fourth forward speed ratio is established with the engagement of the brake 252 and the clutch 254. The brake 252 connects the sun gear member 242 with the transmission housing 260. The clutch 254 connects the ring gear member 224 with the planet carrier assembly member 236. The ring gear member 234 rotates at the same speed as the planet carrier assembly member 246. The sun gear member 232 rotates at the same speed as the sun gear member 222 and the input shaft 17. The planet carrier assembly member 236 rotates at the same speed as the output shaft 19, the ring gear member 224, and the ring gear member 244. The speed of the planet carrier assembly member 236 is determined from the speed of the ring gear member 234, the speed of the sun gear member 232, and the ring gear/sun gear tooth ratio of the planetary gear set 230. The sun gear member 242 does not rotate. The planet carrier assembly member 246 rotates at a speed determined by the speed of the ring gear member 244 and the ring gear/sun gear tooth ratio of the planetary gear set 240. The overall numerical value of the fourth forward speed ratio is determined from the tooth ratios of the planetary gear sets 230 and 240.

The fifth forward speed ratio is established with the engagement of the clutches 254 and 256. In this configuration, the input shaft 17 is directly connected with the output shaft 19. The overall numerical value of the fifth forward speed ratio is 1.

As previously set forth, the truth table of FIG. 3b describes the combinations of engagements utilized for the five forward speed ratios and one reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse to first forward speed ratio. For example, the first to second ratio interchange has a step of 1.41. It can also be readily determined from the truth table of FIG. 3b that all of the single step forward ratio interchanges are of the single transition variety, as are all of the double step forward interchanges.

Figures 4A, 4B:
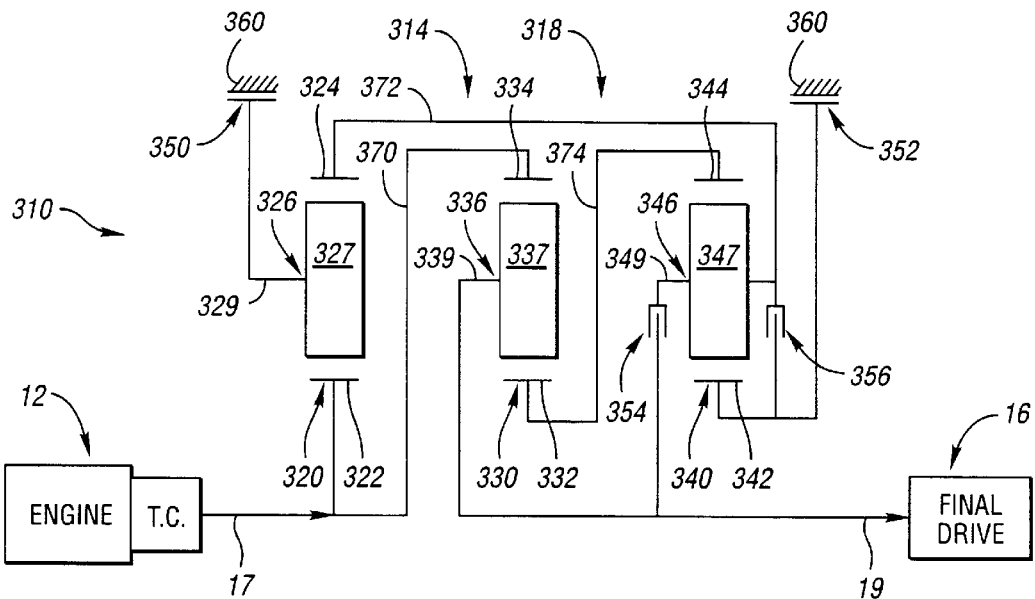

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes four torque transmitting mechanisms 350, 352, 354 and 356. The torque-transmitting mechanisms 350 and 352 are stationary-type torque-transmitting mechanisms, commonly termed brakes or reaction clutches. The torque transmitting mechanisms 354 and 356 are of the rotating type torque transmitting mechanisms, commonly termed clutches.

The input shaft 17 is continuously connected with the sun gear member 322, and the output shaft 19 is continuously connected with the planet carrier assembly member 336. The sun gear member 322 is continuously connected with the ring gear member 334 through the interconnecting member 370. The ring gear member 324 is continuously connected with the planet carrier assembly member 346 through the interconnecting member 372. The sun gear member 332 is continuously connected with the ring gear member 344 through the interconnecting member 374.

The planet carrier assembly member 326 is selectively connectable to the transmission housing 360 through the brake 350. The sun gear member 342 is selectively connectable with the transmission housing 360 through the brake 352. The planet carrier assembly member 336 is connectable with the planet carrier assembly member 346 through the clutch 354. The sun gear member 342 is selectively connectable with the planet carrier assembly member 346 through the clutch 356.

The truth tables given in FIGS. 4b, 5b, 6b, 7b, 8b, 9b, 10b, 11b, 12b, 13b, 14b, 15b and 16b show the engagement sequences for the torque transmitting mechanisms to provide at least five forward speed ratios and one reverse ratio. As shown and described for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and the five forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.40. It can be readily determined from the truth table of FIG. 4b that each of the forward single step ratio interchanges is a single transition shift, as are the double step interchanges. The chart also shows that the torque transmitting mechanism 350 can be engaged through the neutral condition to simplify the forward/reverse interchange.

Those skilled in the art will recognize that the numerical value of the reverse speed ratio is determined utilizing the ring gear/sun gear tooth ratio of the planetary gear set 320. The numerical value of the first forward speed ratio is determined utilizing the ring gear/sun gear tooth ratios of the planetary gear sets 320, 330 and 340. The numerical value of the second forward speed ratio is determined utilizing the ring gear/sun gear tooth ratios of the planetary gear sets 320 and 330. The numerical value of the third forward speed ratio is determined utilizing the ring gear/sun gear tooth ratio of the planetary gear set 330. The numerical value of the fourth forward speed ratio is 1. The numerical value of the fifth forward speed ratio is determined utilizing the ring gear/sun gear tooth ratios of the planetary gear sets 330 and 340.

Figures 5A, 5B:
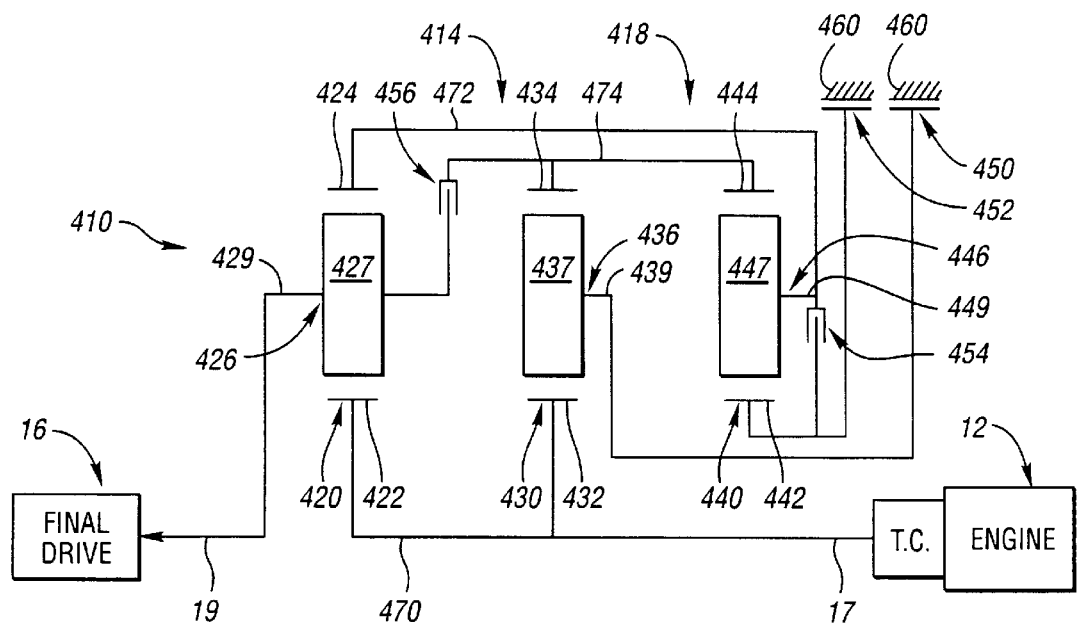

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes four torque transmitting mechanisms 450, 452, 454 and 456. The torque transmitting mechanisms 450 and 452 are stationary-type torque transmitting mechanisms, commonly termed brakes or reaction clutches. The torque transmitting mechanisms 454 and 456 are of the rotating type torque transmitting mechanisms, commonly termed clutches.

The input shaft 17 is continuously connected with the sun gear member 432, and the output shaft 19 is continuously connected with the planet carrier assembly member 426. The sun gear member 422 is continuously connected with the sun gear member 432 through the interconnecting member 470. The ring gear member 424 is continuously connected with the planet carrier assembly member 446 through the interconnecting member 472. The ring gear member 434 is continuously connected with the ring gear member 444 through the interconnecting member 474.

The planet carrier assembly member 436 is selectively connectable with the transmission housing 460 through the brake 450. The sun gear member 442 is selectively connectable with the transmission housing 460 through the brake 452. The sun gear member 442 is selectively connectable with the planet carrier assembly member 446 through the clutch 454. The planet carrier assembly member 426 is selectively connectable with the ring gear member 434 through the clutch 456.

The truth table shown in FIG. 5b describes the engagement combination and sequence of the torque transmitting mechanisms 450, 452, 454 and 456 that are employed to provide the reverse drive ratio and the five forward speed ratios. It should be noted that the torque transmitting mechanism 450 is engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts, as are the double step interchanges in the forward direction.

FIG. 5b also provides a chart of the ratio steps between adjacent forward ratios and between the reverse and first forward ratio. For example, the ratio step between the first and second forward ratios is 1.44.

Those skilled in the art will recognize that the numerical value of the reverse speed ratio is determined utilizing the tooth ratio of the planetary gear set 430. The numerical value of the first forward speed ratio is determined utilizing the ring gear/sun gear tooth ratios of the planetary gear sets 420 and 430. The numerical value of the second forward speed ratio is determined utilizing the ring gear/sun gear tooth ratios of the planetary gear sets 420, 430 and 440. The numerical value of the third forward speed ratio is determined utilizing the ring gear/sun gear tooth ratio of the planetary gear set 420. The numerical value of the fourth forward speed ratio is determined utilizing the ring gear/sun gear tooth ratios of the planetary gear sets 420 and 440. The numerical value of the fifth forward speed ratio is 1.

Figures 6A, 6B:
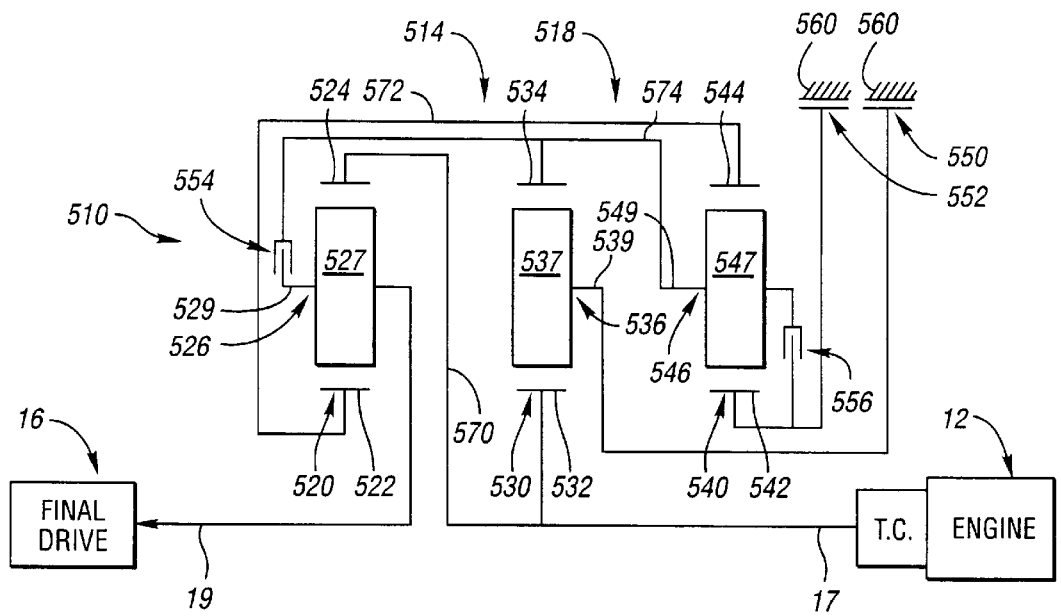

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes four torque transmitting mechanisms 550, 552, 554 and 556. The torque-transmitting mechanisms 550 and 552 are stationary-type torque-transmitting mechanisms, commonly termed brakes or reaction clutches. The torque transmitting mechanisms 554 and 556 are of the rotating type torque transmitting mechanisms, commonly termed clutches.

The input shaft 17 is continuously connected with the sun gear member 532, and the output shaft 19 is continuously connected with the planet carrier assembly member 526. The ring gear member 524 is continuously connected with the sun gear member 532 through the interconnecting member 570. The sun gear member 522 is continuously connected with the ring gear member 544 through the interconnecting member 572. The ring gear member 534 is continuously connected with the planet carrier assembly member 546 through the interconnecting member 574.

The planet carrier assembly member 536 is selectively connectable with the transmission housing 560 through the brake 550. The sun gear member 542 is selectively connectable with the transmission housing 560 through the brake 552. The planet carrier assembly member 526 is selectively connectable with the ring gear member 534 through the clutch 554. The planet carrier assembly member 546 is selectively connectable with the sun gear member 542 through the clutch 556.

The truth table shown in FIG. 6b describes the engagement sequence and combination of the torque transmitting mechanisms to provide the reverse speed ratio and five forward speed ratios. It should be noted that the torque transmitting mechanism 550 can remain engaged through the neutral condition, thereby simplifying the forward/reverse interchange. It can also be determined from the truth table of FIG. 6b that all of the single step forward ratio interchanges are of the single transition variety, as are all of the double step forward interchanges. The chart of FIG. 6b describes the ratio steps between adjacent forward speed ratios and the ratio step between the reverse and first forward speed ratio.

Those skilled in the art, upon reviewing the truth table and the schematic representation of FIG. 6a, can determine that the numerical value of the reverse speed ratio is determined utilizing the ring gear/sun gear tooth ratio of the planetary gear set 530. The numerical value of the first forward speed ratio is determined utilizing the ring gear/sun gear tooth ratios of the planetary gear sets 520, 530 and 540. The numerical value of the second forward speed ratio is determined utilizing the ring gear/sun gear tooth ratios of the planetary gear sets 520 and 530. The numerical value of the third forward speed ratio is determined utilizing the ring gear/sun gear tooth ratio of the planetary gear set 520. The numerical value of the fourth forward speed ratio is 1. The numerical value of the fifth forward speed ratio is determined utilizing the ring gear/sun gear tooth ratios of the planetary gear sets 520 and 540.

The sample speed ratios given in the truth table are determined utilizing the tooth ratio values also given in FIG. 6b. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
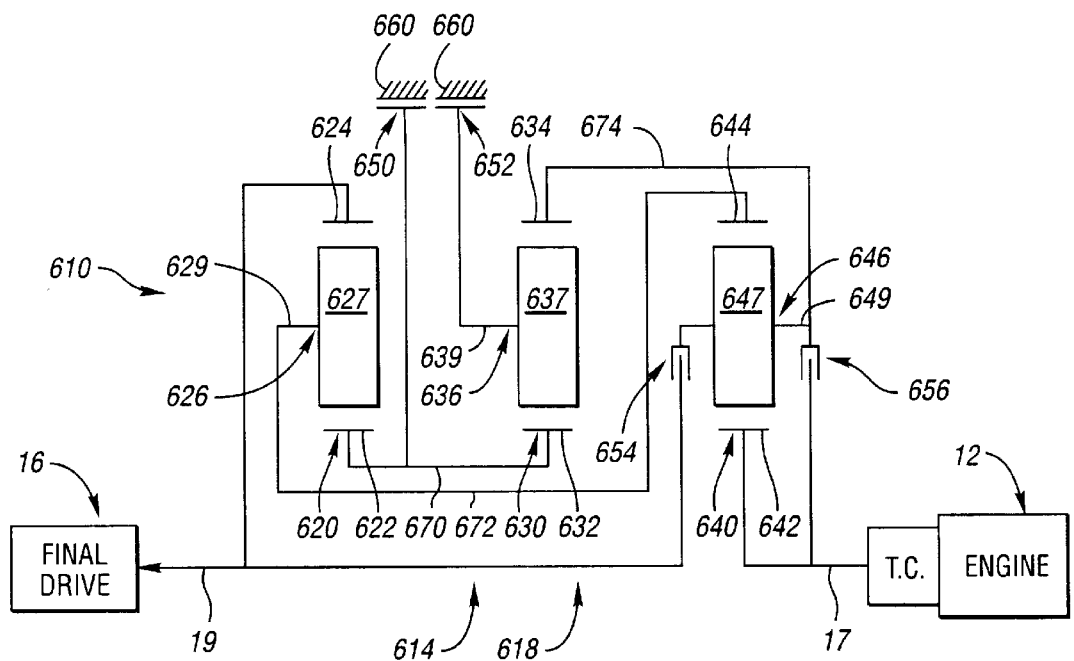

A powertrain 610, shown in FIG. 7a, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes four torque transmitting mechanisms 650, 652, 654 and 656. The torque-transmitting mechanisms 650 and 652 are stationary-type torque-transmitting mechanisms, commonly termed brakes or reaction clutches. The torque transmitting mechanisms 654 and 656 are of the rotating type torque transmitting mechanisms, commonly termed clutches.

The input shaft 17 is continuously connected with the sun gear member 642, and the output shaft 19 is continuously connected with the ring gear member 624. The sun gear member 622 is continuously connected with the sun gear member 632 through the interconnecting member 670. The planet carrier assembly member 626 is continuously connected with the ring gear member 644 through the interconnecting member 672. The ring gear member 634 is continuously connected with the planet carrier assembly member 646 through the interconnecting member 674.

The sun gear member 622 is selectively connectable with the transmission housing 660 through the brake 650. The planet carrier assembly member 636 is selectively connectable with the transmission housing 660 through the brake 652. The ring gear member 624 is selectively connectable with the planet carrier assembly member 646 through the clutch 654. The sun gear member 642 is selectively connectable with the planet carrier assembly member 646 through the clutch 656.

The truth table shown in FIG. 7b describes the combination of torque transmitting mechanism engagements that will provide the reverse drive ratio and the five forward speed ratios, as well as the sequence of these engagements and interchanges. The torque transmitting mechanism 650 can be engaged through the neutral condition, thereby simplifying the forward/reverse interchange. It can be noted from the truth table that each of the single step forward interchanges are single transition ratio changes, and the double step forward interchanges are also single transition ratio changes.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the reverse and second forward speed ratios have numerical values determined utilizing the ring gear/sun gear tooth ratios of the planetary gear sets 620 and 640. The numerical value of the first forward speed ratio is determined utilizing the ring gear/sun gear tooth ratios of the planetary gear sets 620, 630 and 640. The third forward speed ratio is 1. The numerical value of the fourth forward speed ratio is determined utilizing the ring gear/sun gear tooth ratio of the planetary gear set 620. The numerical value of the fifth forward speed ratio is determined utilizing the ring gear/sun gear tooth ratios of the planetary gear sets 620 and 630.

Figures 8A, 8B:
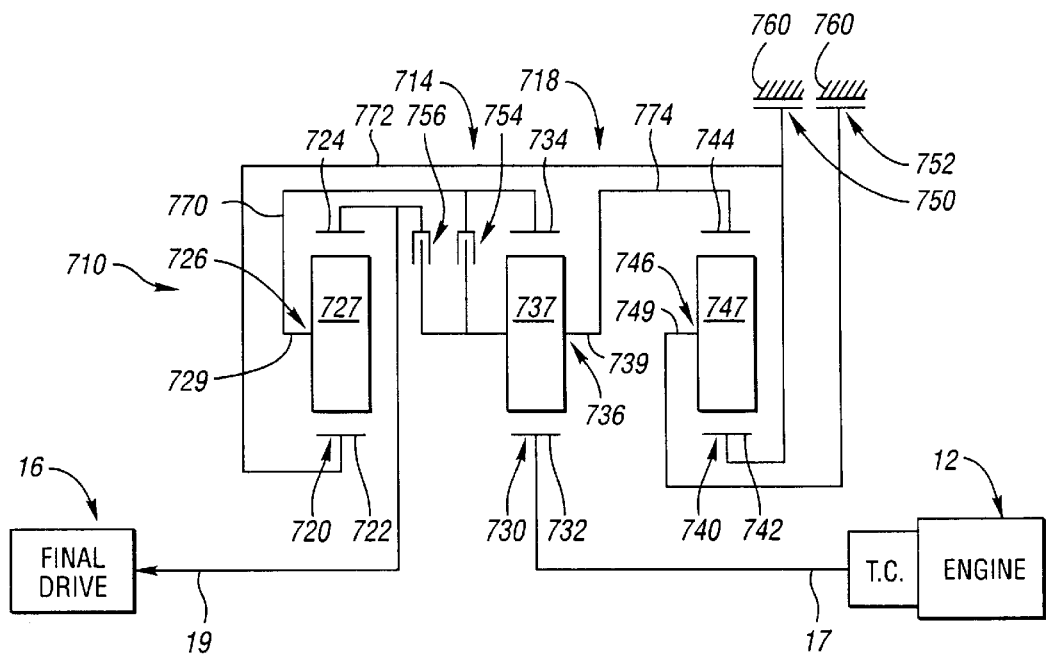

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes four torque transmitting mechanisms 750, 752, 754 and 756. The torque transmitting mechanisms 750 and 752 are stationary-type torque transmitting mechanisms, commonly termed brakes or reaction clutches. The torque transmitting mechanisms 754 and 756 are of the rotating type torque transmitting mechanisms, commonly termed clutches.

The input shaft 17 is continuously connected with the sun gear member 732, and the output shaft 19 is continuously connected with the ring gear member 724. The planet carrier assembly member 726 is continuously connected with the ring gear member 734 through the interconnecting member 770. The sun gear member 722 is continuously connected with the sun gear member 742 through the interconnecting member 772. The planet carrier assembly member 736 is continuously connected with the ring gear member 744 through the interconnecting member 774.

The sun gear member 742 is selectively connectable with the transmission housing 760 through the brake 750. The planet carrier assembly member 746 is selectively connectable with the transmission housing 760 through the brake 752. The planet carrier assembly member 726 is selectively connectable with the planet carrier assembly member 736 through the clutch 754. The ring gear member 724 is selectively connectable with the planet carrier assembly member 736 through the clutch 756.

The truth table of FIG. 8b defines the torque transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740. As can also be determined from the truth table of FIG. 8b, the single step forward interchanges are single transition shifts, as are the double step interchanges in the forward direction.

FIG. 8b also provides a chart of the ratio steps between adjacent forward ratios and between the reverse and first forward ratio. For example, the ratio step between the first and second forward ratios is 1.71. Those skilled in the art will recognize that the numerical values of the reverse and second forward speed ratios are determined utilizing the ring gear/sun gear tooth ratios of the planetary gear sets 720 and 730. The numerical value of the first forward speed ratio is determined utilizing the ring gear/sun gear tooth ratios of the planetary gear sets 720, 730 and 740. The numerical value of the third forward speed ratio is 1. The numerical value of the fourth forward speed ratio is determined utilizing the ring gear/sun gear tooth ratio of the planetary gear set 720. The numerical value of the fifth forward speed ratio is determined utilizing the ring gear/sun gear tooth ratios of the planetary gear sets 720 and 740.

Figures 9A, 9B:
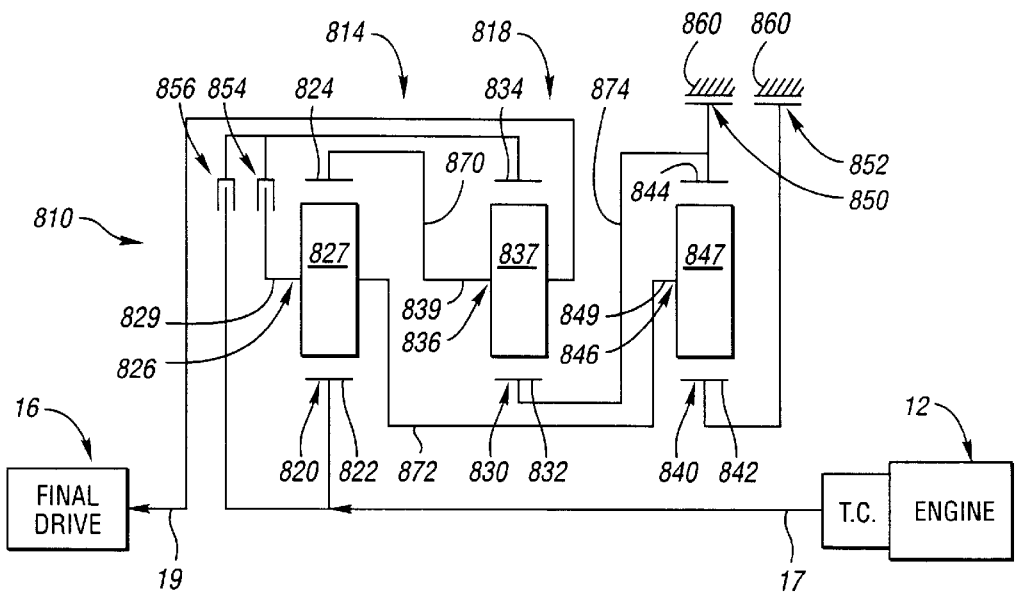

A powertrain 810, shown in FIG. 9a, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes four torque transmitting mechanisms 850, 852, 854 and 856. The torque-transmitting mechanisms 850 and 852 are stationary-type torque-transmitting mechanisms, commonly termed brakes or reaction clutches. The torque transmitting mechanisms 854 and 856 are of the rotating type torque transmitting mechanisms, commonly termed clutches.

The input shaft 17 is continuously connected with the sun gear member 822, and the output shaft 19 is continuously connected with the planet carrier assembly member 836. The ring gear member 824 is continuously connected with the planet carrier assembly member 836 through the interconnecting member 870. The planet carrier assembly member 826 is continuously connected with the planet carrier assembly member 846 through the interconnecting member 872. The sun gear member 832 is continuously connected with the ring gear member 844 through the interconnecting member 874.

The ring gear member 844 is selectively connectable with the transmission housing 860 through the brake 850. The sun gear member 842 is selectively connectable with the transmission housing 860 through the brake 852. The planet carrier assembly member 826 is selectively connectable with the ring gear member 834 through the clutch 854. The sun gear member 822 is selectively connectable with the ring gear member 834 through the clutch 856.

The truth table shown in FIG. 9b defines the torque transmitting mechanism engagement sequence that provides the reverse ratio and five forward speed ratios shown in the truth table and available with the planetary gear arrangement 818. The truth table indicates that the torque transmitting mechanism 850 can remain engaged through the neutral condition, thereby simplifying the forward/reverse interchange. A sample of numerical values for the individual ratios is also given in the truth table of FIG. 9b. These numerical values have been calculated utilizing the ring gear/sun gear tooth ratios also given by way of example in FIG. 9b. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single and double step forward interchanges are single transition ratio interchanges. FIG. 9b also describes the ratio steps between adjacent forward ratios and between the reverse and first forward ratio. For example, the ratio step between the first and second forward ratios is 1.74.

Those skilled in the art of planetary transmissions will recognize that the numerical value of the reverse speed ratio is determined utilizing the ring gear/sun gear tooth ratio of the planetary gear set 820. The numerical value of the first and second forward speed ratios are determined utilizing the ring gear/sun gear tooth ratios of the planetary gear sets 820 and 830. The numerical value of the third forward speed ratio is one. The numerical values of the fourth and fifth forward speed ratios are determined utilizing the ring gear/sun gear tooth ratios of the planetary gear sets 820, 830 and 840.

Figures 10A, 10B:
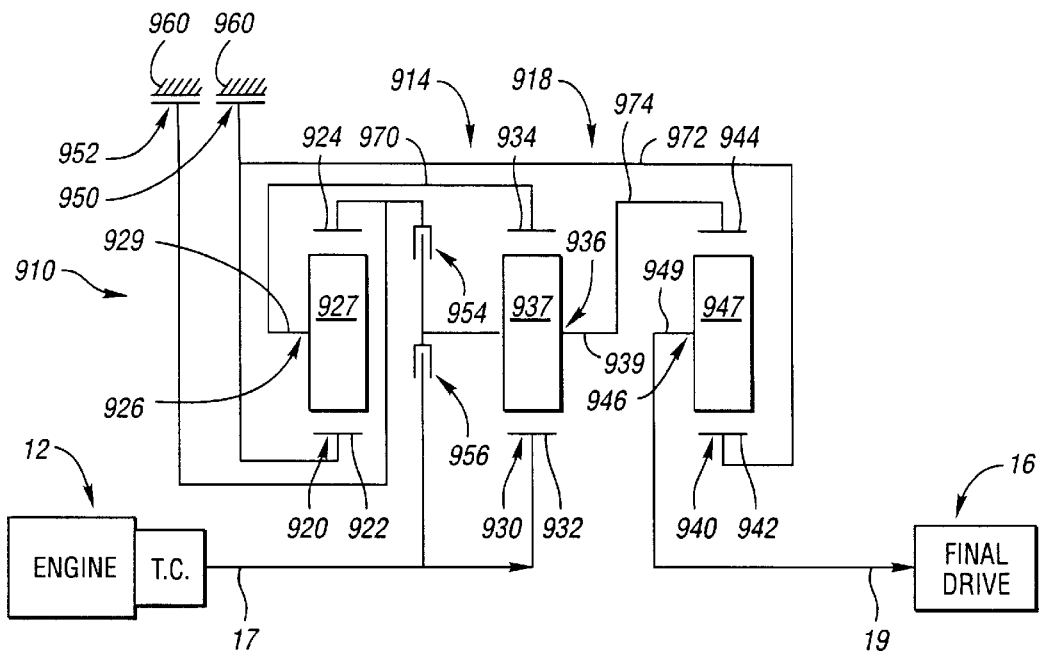

The powertrain 910, shown in FIG. 10a, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of intermeshing pinion gears 927 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes four torque transmitting mechanisms 950, 952, 954 and 956. The torque transmitting mechanisms 950 and 952 are stationary-type torque transmitting mechanisms, commonly termed brakes or reaction clutches. The torque transmitting mechanisms 954 and 956 are of the rotating type torque transmitting mechanisms, commonly termed clutches.

The input shaft 17 is continuously connected with the sun gear member 932, and the output shaft 19 is continuously connected with the planet carrier assembly member 946. The planet carrier assembly member 926 is continuously connected with the ring gear member 934 through the interconnecting member 970. The sun gear member 922 is continuously connected with the sun gear member 942 through the interconnecting member 972. The planet carrier assembly member 936 is continuously connected with the ring gear member 944 through the interconnecting member 974.

The sun gear member 922 is selectively connectable with the transmission housing 960 through the brake 950. The ring gear member 924 is selectively connectable with the transmission housing 960 through the brake 952. The ring gear member 924 is selectively connectable with the planet carrier assembly member 936 through the clutch 954. The planet carrier assembly member 936 is selectively connectable with the sun gear member 932 through the clutch 956.

The truth table of FIG. 10b describes the torque transmitting mechanism engagement sequence utilized to provide the reverse speed ratio and five forward speed ratios. The truth table also provides a set of examples for the ratios for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; and the R3/S3 value is the tooth ratio of the planetary gear set 940. It can also be determined from the truth table of FIG. 10b that each of the forward single step and double step ratio interchanges are of the single transition variety.

Those skilled in the art, upon reviewing the engagement combinations, will recognize that the values of the reverse and second forward speed ratios are determined utilizing the ring gear/sun gear tooth ratios of the planetary gear sets 920, 930 and 940. The numerical value of the first forward speed ratio is determined utilizing the ring gear/sun gear tooth ratios of the planetary gear sets 930 and 940. The numerical value of the third forward speed ratio is determined utilizing the ring gear/sun gear tooth ratio of the planetary gear set 940. The numerical value of the fourth forward speed ratio is 1. The numerical value of the fifth forward speed ratio is determined utilizing the ring gear/sun gear tooth ratios of the planetary gear sets 920 and 940.

Figures 11A, 11B:
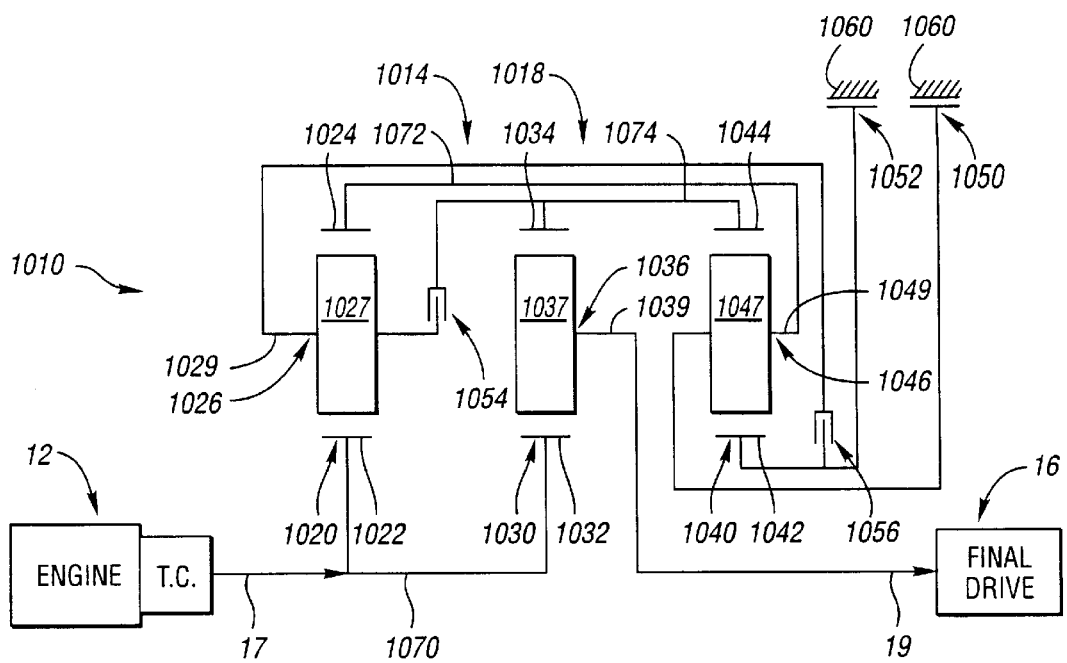

A powertrain 1010, shown in FIG. 11a, includes the conventional engine and torque converter 12, a planetary transmission 1014, and the conventional final drive mechanism 16. The engine and torque converter are drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear arrangement 1018 also includes four torque transmitting mechanisms 1050, 1052, 1054 and 1056. The torque-transmitting mechanisms 1050 and 1052 are stationary-type torque-transmitting mechanisms, commonly termed brakes or reaction clutches. The torque transmitting mechanisms 1054 and 1056 are of the rotating type torque transmitting mechanisms, commonly termed clutches.

The input shaft 17 is continuously connected with the sun gear member 1022, and the output shaft 19 is continuously connected with the planet carrier assembly member 1036. The sun gear member 1022 is continuously connected with the sun gear member 1032 through the interconnecting member 1070. The ring gear member 1024 is continuously connected with the planet carrier assembly member 1046 through the interconnecting member 1072. The ring gear member 1034 is continuously connected with the ring gear member 1044 through the interconnecting member 1074.

The planet carrier assembly member 1046 is selectively connectable with the transmission housing 1060 through the brake 1050. The sun gear member 1042 is selectively connectable with the transmission housing 1060 through the brake 1052. The planet carrier assembly member 1026 is selectively connectable with the ring gear member 1034 through the clutch 1054. The sun gear member 1042 is selectively connectable with the planet carrier assembly member 1026 through the clutch 1056.

The truth table shown in FIG. 11b describes the engagement combinations and the engagement sequence necessary to provide the reverse drive ratio and the five forward speed ratios. A sample of the numerical values for the ratios is also provided in the truth table of FIG. 11b. These values are determined utilizing the ring gear/sun gear tooth ratios also given in FIG. 11b. The R1/S1 value is the tooth ratio for the planetary gear set 1020; the R2/S2 value is the tooth ratio for the planetary gear set 1030; and the R3/S3 value is the tooth ratio for the planetary gear set 1040. Also given in FIG. 11b is a chart describing the step ratios between the adjacent forward speed ratios and the reverse to first forward speed ratio.

Those skilled in the art will recognize that the numerical values of the reverse, first and fourth forward speed ratios are determined utilizing the ring gear/sun gear tooth ratios of the planetary gear sets 1020, 1030 and 1040. The numerical value of the second forward speed ratio is determined utilizing the ring gear/sun gear tooth ratio of the planetary gear set 1030. The numerical value of the third forward speed ratio is determined utilizing the ring gear/sun gear tooth ratios of the planetary gear sets 1020 and 1030. The numerical value of the fifth forward speed ratio is 1.

Figures 12A, 12B:
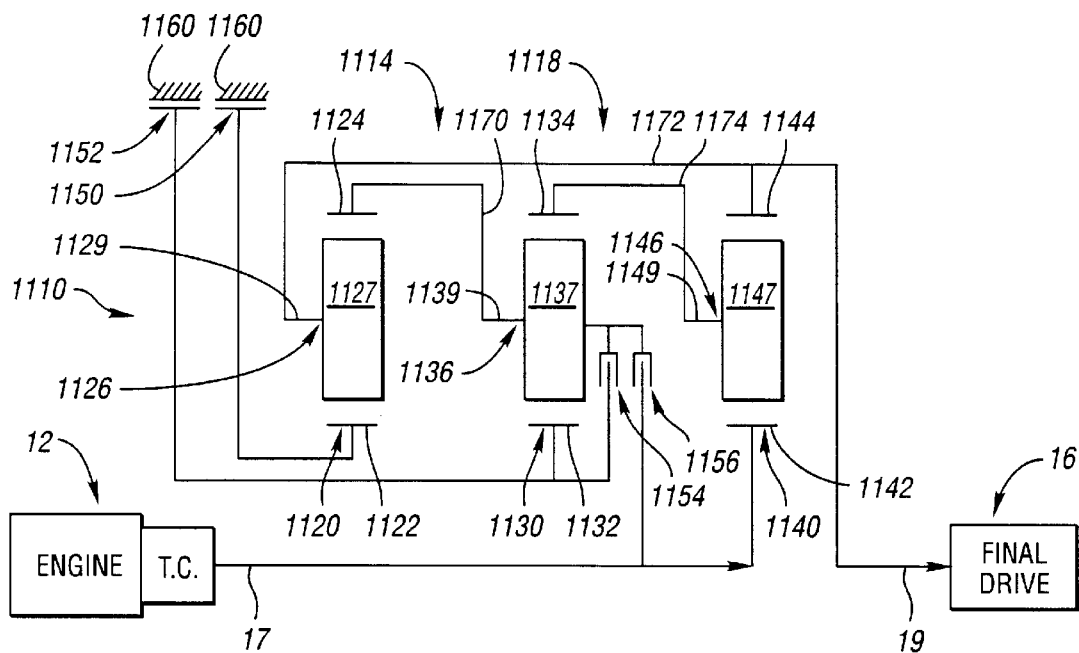

A powertrain 1110, shown in FIG. 12a, includes the conventional engine and torque converter 12, a planetary transmission 1114, and the conventional final drive mechanism 16. The engine and torque converter are drivingly connected with the planetary transmission 1114 through the input shaft 17. The planetary transmission 1114 is drivingly connected with the final drive mechanism 16 through the output shaft 19. The planetary transmission 1114 includes a planetary gear arrangement 1118 that has a first planetary gear set 1120, a second planetary gear set 1130, and a third planetary gear set 1140.

The planetary gear set 1120 includes a sun gear member 1122, a ring gear member 1124, and a planet carrier assembly 1126. The planet carrier assembly 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of pinion gears 1137 rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes four torque transmitting mechanisms 1150, 1152, 1154 and 1156. The torque transmitting mechanisms 1150 and 1152 are stationary-type torque transmitting mechanisms, commonly termed brakes or reaction clutches. The torque transmitting mechanisms 1154 and 1156 are of the rotating type torque transmitting mechanisms, commonly termed clutches.

The input shaft 17 is continuously connected with the sun gear member 1142, and the output shaft 19 is continuously connected with the ring gear member 1144. The ring gear member 1124 is continuously connected with the planet carrier assembly member 1136 through the interconnecting member 1170. The planet carrier assembly member 1126 is continuously connected with the ring gear member 1144 through the interconnecting member 1172. The ring gear member 1134 is continuously connected with the planet carrier assembly member 1146 through the interconnecting member 1174.

The sun gear member 1122 is selectively connectable with the transmission housing 1160 through the brake 1150. The sun gear member 1132 is selectively connectable with the transmission housing 1160 through the brake 1152. The planet carrier assembly member 1136 is selectively connectable with the sun gear member 1132 through the clutch 1154. The planet carrier assembly member 1136 is selectively connectable with the sun gear member 1142 through the clutch 1156.

The truth table shown in FIG. 12b describes the engagement combinations and the engagement sequence necessary to provide the reverse drive ratio and the five forward speed ratios. A sample of the numerical values for the ratios is also provided in the truth table of FIG. 12b. These values are determined utilizing the ring gear/sun gear tooth ratios also given in FIG. 12b. The R1/S1 value is the tooth ratio for the planetary gear set 1120; the R2/S2 value is the tooth ratio for the planetary gear set 1130; and the R3/S3 value is the tooth ratio for the planetary gear set 1140. Also given in FIG. 12b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1140. The numerical value of the first forward speed ratio is determined utilizing the ring gear/sun gear tooth ratios of the planetary gear sets 1120, 1130 and 1140. The numerical value of the second forward speed ratio is determined utilizing the ring gear/sun gear tooth ratios of the planetary gear sets 1120 and 1140. The numerical value of the third forward speed ratio is determined utilizing the ring gear/sun gear tooth ratio of the planetary gear set 1120. The numerical value of the fourth forward speed ratio is 1. The numerical value of the fifth forward speed ratio is determined utilizing the ring gear/sun gear tooth ratios of the planetary gear sets 1130 and 1140.

Figures 13A, 13B:
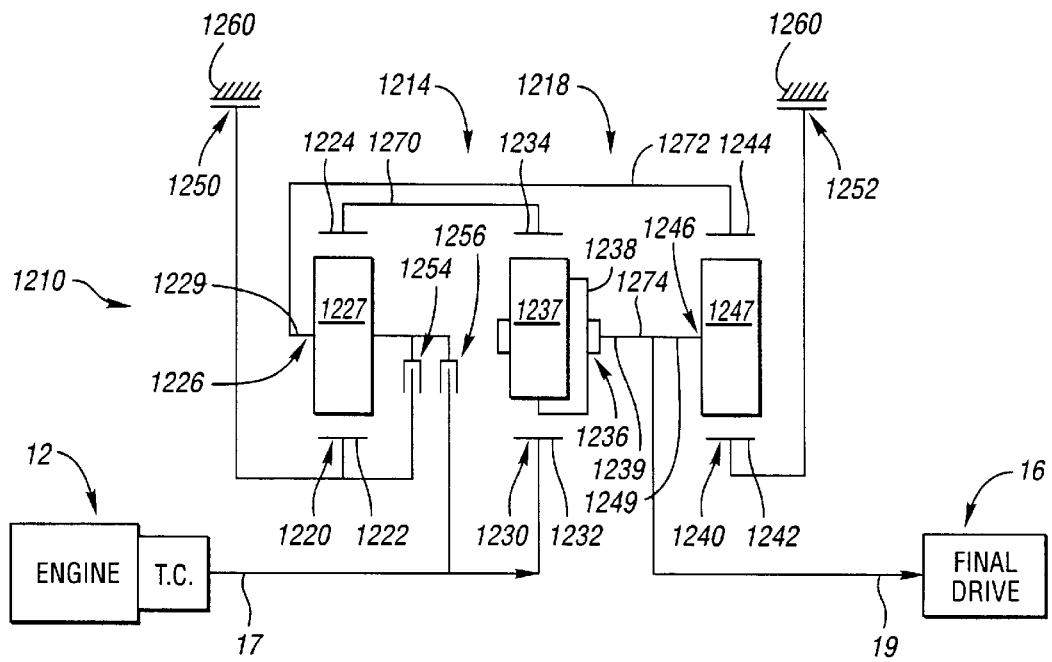

A powertrain 1210, shown in FIG. 13a, includes the conventional engine and torque converter 12, a planetary transmission 1214, and the conventional final drive mechanism 16. The engine and torque converter are drivingly connected with the planetary transmission 1214 through the input shaft 17. The planetary transmission 1214 is drivingly connected with the final drive mechanism 16 through the output shaft 19. The planetary transmission 1214 includes a planetary gear arrangement 1218 that has a first planetary gear set 1220, a second planetary gear set 1230, and a third planetary gear set 1240.

The planetary gear set 1220 includes a sun gear member 1222, a ring gear member 1224, and a planet carrier assembly 1226. The planet carrier assembly 1226 includes a plurality of pinion gears 1227 rotatably mounted on a carrier member 1229 and disposed in meshing relationship with both the sun gear member 1222 and the ring gear member 1224.

The planetary gear set 1230 includes a sun gear member 1232, a ring gear member 1234, and a planet carrier assembly member 1236. The planet carrier assembly member 1236 includes a plurality of pinion gears 1237 and 1238 rotatably mounted on a carrier member 1239 and disposed in meshing relationship with both the sun gear member 1232 and the ring gear member 1234.

The planetary gear set 1240 includes a sun gear member 1242, a ring gear member 1244, and a planet carrier assembly member 1246. The planet carrier assembly member 1246 includes a plurality of pinion gears 1247 rotatably mounted on a carrier member 1249 and disposed in meshing relationship with both the sun gear member 1242 and the ring gear member 1244.

The planetary gear arrangement 1218 also includes four torque transmitting mechanisms 1250, 152, 1254 and 1256. The torque transmitting mechanisms 1250 and 1252 are stationary-type torque transmitting mechanisms, commonly termed brakes or reaction clutches. The torque transmitting mechanisms 1254 and 1256 are of the rotating type torque transmitting mechanisms, commonly termed clutches.

The input shaft 17 is continuously connected with the sun gear member 1232, and the output shaft 19 is continuously connected with the planet carrier assembly member 1246. The ring gear member 1224 is continuously connected with the ring gear member 1234 through the interconnecting member 1270. The planet carrier assembly member 1226 is continuously connected with the ring gear member 1244 through the interconnecting member 1272. The planet carrier assembly member 1236 is continuously connected with the planet carrier assembly member 1246 through the interconnecting member 1274.

The sun gear member 1222 is selectively connectable with the transmission housing 1260 through the brake 1250. The sun gear member 1242 is selectively connectable with the transmission housing 1260 through the brake 1252. The sun gear member 1222 is selectively connectable with the planet carrier assembly member 1226 through the clutch 1254. The planet carrier assembly member 1226 is selectively connectable with the sun gear member 1232 through the clutch 1256.

The truth table shown in FIG. 13b describes the engagement combinations and the engagement sequence necessary to provide the reverse drive ratio and the five forward speed ratios. A sample of the numerical values for the ratios is also provided in the truth table of FIG. 13b. These values are determined utilizing the ring gear/sun gear tooth ratios also given in FIG. 13b. The R1/S1 value is the tooth ratio for the planetary gear set 1220; the R2/S2 value is the tooth ratio for the planetary gear set 1230; and the R3/S3 value is the tooth ratio for the planetary gear set 1240. Also given in FIG. 13b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1230. The numerical value of the first forward speed ratio is determined utilizing the ring gear/sun gear tooth ratios of the planetary gear sets 1220, 1230 and 1240. The numerical value of the second forward speed ratio is determined utilizing the ring gear/sun gear tooth ratios of the planetary gear sets 1230 and 1240. The numerical value of the third forward speed ratio is determined utilizing the ring gear/sun gear tooth ratio of the planetary gear set 1240. The numerical value of the fourth forward speed ratio is 1. The numerical value of the fifth forward speed ratio is determined utilizing the ring gear/sun gear tooth ratios of the planetary gear sets 1220 and 1230.

Figures 14A, 14B:
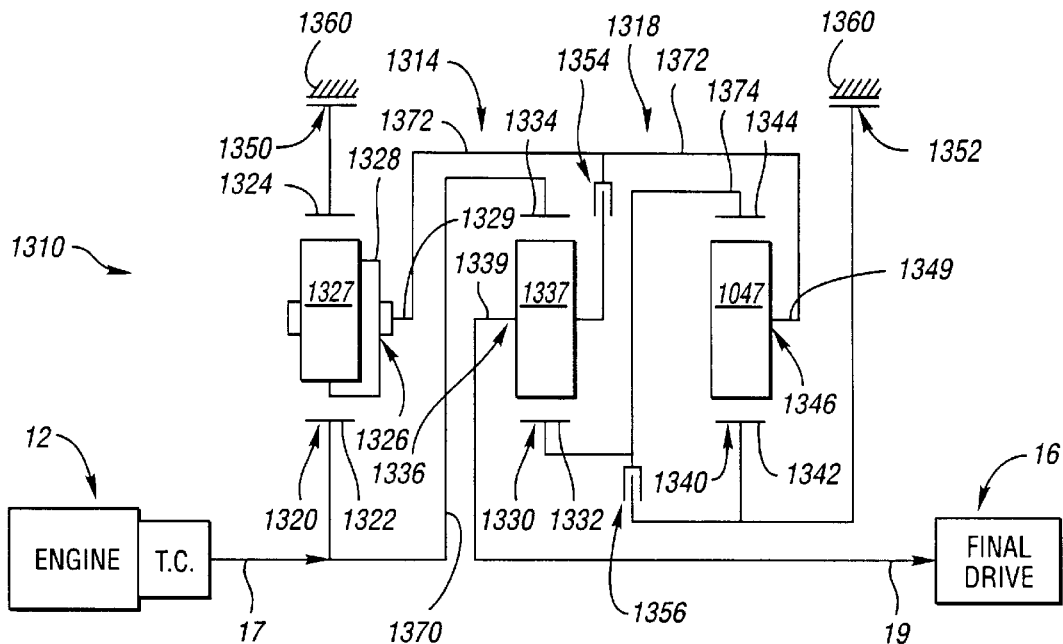

A powertrain 1310, shown in FIG. 14a, includes the conventional engine and torque converter 12, a planetary transmission 1314, and the conventional final drive mechanism 16. The engine and torque converter are drivingly connected with the planetary transmission 1314 through the input shaft 17. The planetary transmission 1314 is drivingly connected with the final drive mechanism 16 through the output shaft 19. The planetary transmission 1314 includes a planetary gear arrangement 1318 that has a first planetary gear set 1320, a second planetary gear set 1330, and a third planetary gear set 1340.

The planetary gear set 1320 includes a sun gear member 1322, a ring gear member 1324, and a planet carrier assembly 1326. The planet carrier assembly 1326 includes a plurality of pinion gears 1327 and 1328 rotatably mounted on a carrier member 1329 and disposed in meshing relationship with both the sun gear member 1322 and the ring gear member 1324.

The planetary gear set 1330 includes a sun gear member 1332, a ring gear member 1334, and a planet carrier assembly member 1336. The planet carrier assembly member 1336 includes a plurality of pinion gears 1337 rotatably mounted on a carrier member 1339 and disposed in meshing relationship with both the sun gear member 1332 and the ring gear member 1334.

The planetary gear set 1340 includes a sun gear member 1342, a ring gear member 1344, and a planet carrier assembly member 1346. The planet carrier assembly member 1346 includes a plurality of pinion gears 1347 rotatably mounted on a carrier member 1349 and disposed in meshing relationship with both the sun gear member 1342 and the ring gear member 1344.

The planetary gear arrangement 1318 also includes four torque transmitting mechanisms 1350, 1352, 1354 and 1356. The torque transmitting mechanisms 1350 and 1352 are stationary-type torque transmitting mechanisms, commonly termed brakes or reaction clutches. The torque transmitting mechanisms 1354 and 1356 are of the rotating-type torque transmitting mechanisms, commonly termed clutches.

The input shaft 17 is continuously connected with the sun gear member 1322. The output shaft 19 is continuously connected with the planet carrier assembly member 1336. The sun gear member 1322 is continuously connected with the ring gear member 1334 through the interconnecting member 1370. The planet carrier assembly member 1326 is continuously connected with the planet carrier assembly member 1346 through the interconnecting member 1372. The sun gear member 1332 is continuously connected with the ring gear member 1344 through the interconnecting member 1374.

The ring gear member 1324 is selectively connectable with the transmission housing 1360 through the brake 1350. The sun gear member 1342 is selectively connectable with the transmission housing 1360 through the brake 1352. The planet carrier assembly member 1326 is selectively connectable with the planet carrier assembly member 1336 through the clutch 1354. The sun gear member 1332 is selectively connectable with the sun gear member 1342 through the clutch 1356.

The truth table shown in FIG. 14b describes the engagement combinations and the engagement sequence necessary to provide the reverse drive ratio and the five forward speed ratios. A sample of the numerical values for the ratios is also provided in the truth table of FIG. 14b. These values are determined utilizing the ring gear/sun gear tooth ratios also given in FIG. 14b. The R1/S1 value is the tooth ratio for the planetary gear set 1320; the R2/S2 value is the tooth ratio for the planetary gear set 1330; and the R3/S3 value is the tooth ratio for the planetary gear set 1340. Also given in FIG. 14b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1320. The numerical value of the first forward speed ratio is determined utilizing the ring gear/sun gear tooth ratios of the planetary gear sets 1320, 1330 and 1340. The numerical value of the second forward speed ratio is determined utilizing the ring gear/sun gear tooth ratios of the planetary gears 1320 and 1330. The numerical value of the third forward speed ratio is determined utilizing the ring gear/sun gear tooth ratio of the planetary gear set 1330. The numerical value of the fourth forward speed ratio is 1. The numerical value of the fifth forward speed ratio is determined utilizing the ring gear/sun gear tooth ratios of the planetary gear sets 1330 and 1340.

Figures 15A, 15B:
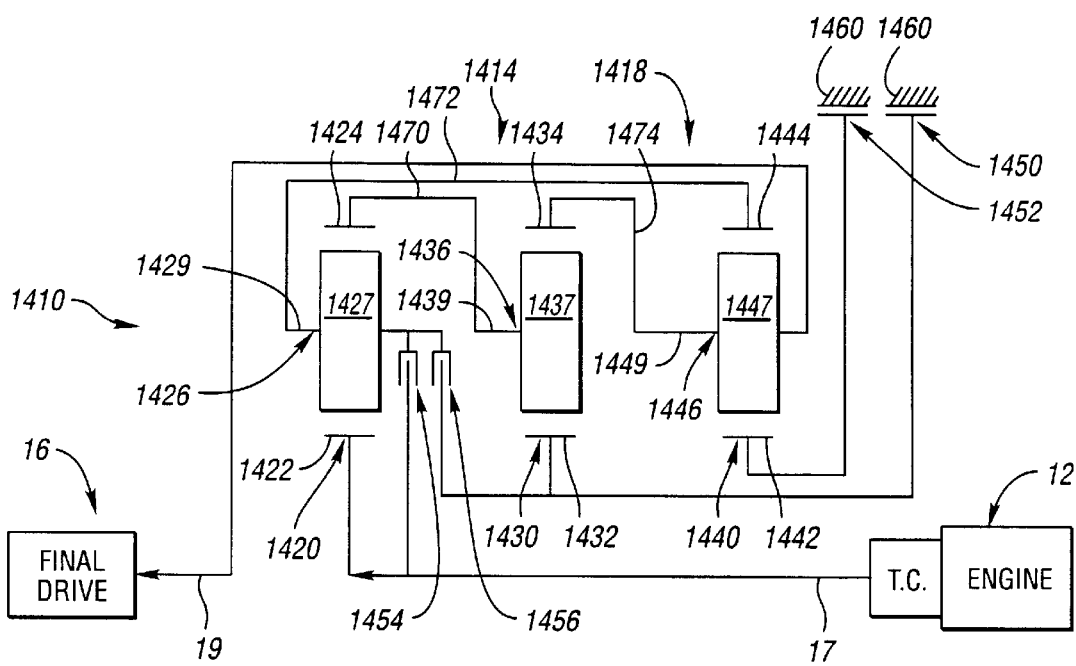

A powertrain 1410, shown in FIG. 15*a*, includes the conventional engine and torque converter 12, a planetary transmission 1414, and the conventional final drive mechanism 16. The engine and torque converter are drivingly connected with the planetary transmission 1414 through the input shaft 17. The planetary transmission 1414 is drivingly connected with the final drive mechanism 16 through the output shaft 19. The planetary transmission 1414 includes a planetary gear arrangement 1418 that has a first planetary gear set 1420, a second planetary gear set 1430, and a third planetary gear set 1440.

The planetary gear set 1420 includes a sun gear member 1422, a ring gear member 1424, and a planet carrier assembly 1426. The planet carrier assembly 1426 includes a plurality of pinion gears 1427 rotatably mounted on a carrier member 1429 and disposed in meshing relationship with both the sun gear member 1422 and the ring gear member 1424.

The planetary gear set 1430 includes a sun gear member 1432, a ring gear member 1434, and a planet carrier assembly member 1436. The planet carrier assembly member 1436 includes a plurality of pinion gears 1437 rotatably mounted on a carrier member 1439 and disposed in meshing relationship with both the sun gear member 1432 and the ring gear member 1434.

The planetary gear set 1440 includes a sun gear member 1442, a ring gear member 1444, and a planet carrier assembly member 1446. The planet carrier assembly member 1446 includes a plurality of pinion gears 1447 rotatably mounted on a carrier member 1449 and disposed in meshing relationship with both the sun gear member 1442 and the ring gear member 1444.

The planetary gear arrangement 1418 also includes four torque transmitting mechanisms 1450, 1452, 1454 and 1456. The torque transmitting mechanisms 1450 and 1452 are a stationary-type torque transmitting mechanisms, commonly termed brakes or reaction clutches. The torque transmitting mechanisms 1454 and 1456 are of the rotating type torque transmitting mechanisms, commonly termed clutches.

The input shaft 17 is continuously connected with the sun gear member 1422, and the output shaft 19 is continuously connected with the planet carrier assembly member 1446. The ring gear member 1424 is continuously connected with the planet carrier assembly member 1436 through the interconnecting member 1470. The planet carrier assembly member 1426 is continuously connected with the ring gear member 1444 through the interconnecting member 1472. The ring gear member 1434 is continuously connected with the planet carrier assembly member 1446 through the interconnecting member 1474.

The sun gear member 1432 is selectively connectable with the transmission housing 1460 through the brake 1450. The sun gear member 1442 is selectively connectable with the transmission housing 1460 through the brake 1452. The planet carrier assembly member 1426 is selectively connectable with the sun gear member 1422 through the clutch 1454. The planet carrier assembly member 1426 is selectively connectable with the sun gear member 1432 through the clutch 1456.

The truth table shown in FIG. 15*b* describes the engagement combinations and the engagement sequence necessary to provide the reverse drive ratio and the five forward speed ratios. A sample of the numerical values for the ratios is also provided in the truth table of FIG. 15*b*. These values are determined utilizing the ring gear/sun gear tooth ratios also given in FIG. 15*b*. The R1/S1 value is the tooth ratio for the planetary gear set 1420; the R2/S2 value is the tooth ratio for the planetary gear set 1430; and the R3/S3 value is the tooth ratio for the planetary gear set 1440. Also given in FIG. 15*b* is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratios of the planetary gear sets 1420 and 1430. The numerical values of the first and second forward speed ratios are determined utilizing the ring gear/sun gear tooth ratios of the planetary gear sets 1420, 1430 and 1440. The numerical value of the third forward speed ratio is determined utilizing the ring gear/sun gear tooth ratio of the planetary gear set 1440. The numerical value of the fourth forward speed ratio is 1. The numerical value of the fifth forward speed ratio is determined utilizing the ring gear/sun gear tooth ratio of the planetary gear set 1430.

Figures 16A, 16B:
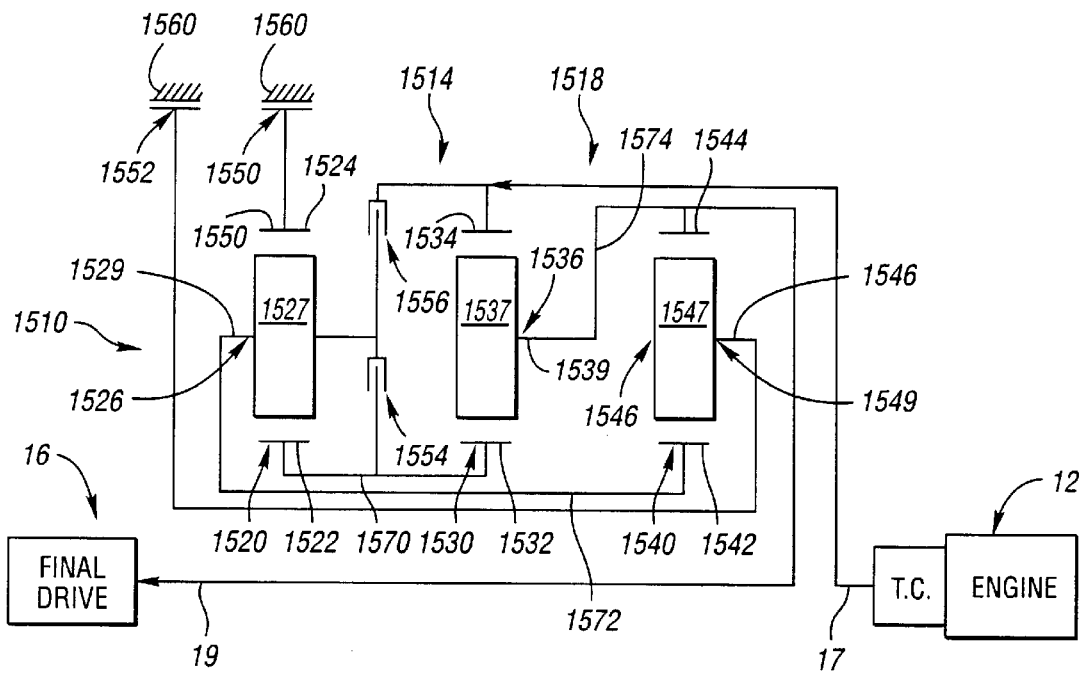

A powertrain 1510, shown in FIG. 16*a*, includes the conventional engine and torque converter 12, a planetary transmission 1514, and the conventional final drive mechanism 16. The engine and torque converter are drivingly connected with the planetary transmission 1514 through the input shaft 17. The planetary transmission 1514 is drivingly connected with the final drive mechanism 16 through the output shaft 19. The planetary transmission 1514 includes a planetary gear arrangement 1518 that has a first planetary gear set 1520, a second planetary gear set 1530, and a third planetary gear set 1540.

The planetary gear set 1520 includes a sun gear member 1522, a ring gear member 1524, and a planet carrier assembly 1526. The planet carrier assembly 1526 includes a plurality of pinion gears 1527 rotatably mounted on a carrier member 1529 and disposed in meshing relationship with both the sun gear member 1522 and the ring gear member 1524.

The planetary gear set 1530 includes a sun gear member 1532, a ring gear member 1534, and a planet carrier assembly member 1536. The planet carrier assembly member 1536 includes a plurality of pinion gears 1537 rotatably mounted on a carrier member 1539 and disposed in meshing relationship with both the sun gear member 1532 and the ring gear member 1534.

The planetary gear set 1540 includes a sun gear member 1542, a ring gear member 1544, and a planet carrier assembly member 1546. The planet carrier assembly member 1546 includes a plurality of pinion gears 1547 rotatably mounted on a carrier member 1549 and disposed in meshing relationship with both the sun gear member 1542 and the ring gear member 1544.

The planetary gear arrangement 1518 also includes four torque transmitting mechanisms 1550, 1552, 1554 and 1556. The torque transmitting mechanism 1550 and 1552 are stationary-type torque transmitting mechanisms, commonly termed brakes or reaction clutches. The torque transmitting mechanism 1554 and 1556 are of the rotating-type torque transmitting mechanisms, commonly termed clutches.

The input shaft 17 is continuously connected with the ring gear member 1534, and the output shaft 19 is continuously connected with the ring gear member 1544. The sun gear member 1522 is continuously connected with the sun gear member 1532 through the interconnecting member 1570. The planet carrier assembly member 1526 is continuously connected with the sun gear member 1542 through the interconnecting member 1572. The planet carrier assembly member 1536 is continuously connected with the ring gear member 1544 through the interconnecting member 1574.

The ring gear member 1524 is selectively connectable with the transmission housing 1560 through the brake 1550. The planet carrier assembly member 1546 is selectively connectable with the transmission housing 1560 through the brake 1552. The planet carrier assembly member 1526 is selectively connectable with the sun gear member 1532 through the clutch 1554. The planet carrier assembly member 1526 is selectively connectable with the ring gear member 1534 through the clutch 1556.

The truth table shown in FIG. 16b describes the engagement combinations and the engagement sequence necessary to provide the reverse drive ratio and the five forward speed ratios. A sample of the numerical values for the ratios is also provided in the truth table of FIG. 16b. These values are determined utilizing the ring gear/sun gear tooth ratios also given in FIG. 16b. The R1/S1 value is the tooth ratio for the planetary gear set 1520; the R2/S2 value is the tooth ratio for the planetary gear set 1530; and the R3/S3 value is the tooth ratio for the planetary gear set 1540. Also given in FIG. 16b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1540. The numerical value of the first forward speed ratio is determined utilizing the ring gear/sun gear tooth ratios of the planetary gear sets 1520, 1530 and 1540. The numerical value of the second forward speed ratio is determined utilizing the ring gear/sun gear tooth ratios of the planetary gear sets 1530 and 1540. The numerical value of the third forward speed ratio is determined utilizing the ring gear/sun gear tooth ratio of the planetary gear set 1530. The numerical value of the fourth forward speed ratio is 1. The numerical value of the fifth forward speed ratio is determined utilizing the ring gear/sun gear tooth ratios of the planetary gear sets 1520 and 1530.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:

an input shaft;

an output shaft;

a planetary gear arrangement having not more than first, second and third planetary gear sets1 each planetary gear set having first, second and third members;

said input shaft being continuously interconnected with a member of the planetary gear sets, said output shaft being continuously interconnected with another member of the planetary gear sets;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set;

a first brake selectively interconnecting a transmission housing with a member of said first or second planetary gear set, said member interconnected with said first brake being different from the members continuously interconnected with said input shaft or output shaft;

a second brake selectively interconnecting said transmission housing with a member of said second or third planetary gear set, said member interconnected with said second brake being different from the members continuously interconnected with said input shaft or output shaft;

a first clutch selectively interconnecting a member of said first planetary gear set with another member of said planetary gear sets;

a second clutch selectively interconnecting a member of said third planetary gear set with another member of said planetary gear sets; and said first and second brakes and said first and second clutches being engaged in combinations of two to establish at least five forward speed ratios and a reverse speed ratio between said input shaft and said output shaft.

2. The transmission defined in claim 1, wherein planet carrier assembly members of each of said planetary gear set are of the single-pinion type.

3. The transmission defined in claim 1, wherein planet carrier assembly members of at least one of said planetary gear sets is of the double-pinion type.

4. A multi-speed transmission comprising:

an input shaft;

an output shaft;

a planetary gear arrangement having not more than first, second and third planetary gear sets, each planetary gear set having first, second and third members;

said input shaft being continuously interconnected with a member of the planetary gear sets, said output shaft being continuously interconnected with another member of the planetary gear sets;

a first interconnecting member continuously interconnecting said first member of said first planetary gear set with said first member of said second planetary gear set;

a second interconnecting member continuously interconnecting said second member of said first planetary gear set with said first member of said third planetary gear set;

a third interconnecting member continuously interconnecting said second member of said second planetary gear set with said second member of said third planetary gear set; and two selectively engageable brakes and two selectively engageable clutches for selectively interconnecting said members of said planetary gear sets and a transmission housing in combinations of two to establish at least five forward speed ratios and one reverse speed ratio between said input shaft and said output shaft.

5. The transmission defined in claim 4, wherein a first of said two brakes is selectively operable for interconnecting said transmission housing with a member of said first or second planetary gear set1 said member interconnected with said first brake being different from the members continuously interconnected with said input shaft or output shaft.

6. The transmission defined in claim 4, wherein a second of said two brakes is selectively operable for interconnecting said transmission housing with a member of said second or third planetary gear sets said member interconnected with said second brake being different from the members continuously interconnected with said input shaft or output shaft.

7. The transmission defined in claim 4, wherein a first of said two clutches is selectively operable for interconnecting a member of said first planetary gear set with another member of said planetary gear sets.

8. The transmission defined in claim 4, wherein a second of said two clutches is selectively operable for interconnecting a member of said third planetary gear set with another member of said planetary gear sets.

9. The transmission defined in claim 4, wherein planet carrier assembly members of each of said planetary gear sets are of the single-pinion type.

10. The transmission defined in claim 4, wherein a planet carrier assembly member of at least one of said planetary gear sets is of the double-pinion type.

11. A multi-speed transmission comprising:
   an input shaft;
   an output shaft;
   a planetary gear arrangement having not more than first, second and third planetary gear sets, each planetary gear set having first, second and third members;
   said input shaft being continuously interconnected with a member of the planetary gear sets, said output shaft being continuously interconnected with another member of the planetary gear sets;
   a first interconnecting member continuously interconnecting said first member of said first planetary gear set with said first member of said second planetary gear set;
   a second interconnecting member continuously interconnecting said second member of said first planetary gear set with said first member of said third planetary gear set;
   a third interconnecting member continuously interconnecting said second member of said second planetary gear set with said second member of said third planetary gear set;
   first and second brakes and first and second clutches being selectively engageable to establish combinations of members joined for common rotation to provide five forward speed ratios and one reverse speed ratio between said input shaft and said output shaft, said combinations including either:
      an engaged combination with said first brake selectively interconnecting said third member of said second planetary gear set with said transmission housing, said second brake selectively interconnecting said third member of said third planetary gear set with said transmission housing, said first clutch selectively interconnecting said third member of said first planetary gear set with said second member of said third planetary gear set, and said second clutch selectively interconnecting said third member of said third planetary gear set with said second member of said third planetary gear set; or
      an engaged combination with said first brake selectively interconnecting said second member of said second planetary gear set with said transmission housing, said second brake selectively interconnecting said third member of said third planetary gear set with said transmission housing, said first clutch selectively interconnecting said first member of said first planetary gear set with said third member of said first planetary gear set, and said second clutch selectively interconnecting said first member of said first planetary gear set with said third member of said third planetary gear set; or
      an engaged combination with said first brake selectively interconnecting said third member of said first planetary gear set with said transmission housing, said second brake selectively interconnecting said third member of said third planetary gear set with said transmission housing, said first clutch selectively interconnecting said second member of said first planetary gear set with said third member of said second planetary gear set, and said second clutch selectively interconnecting said second member of said third planetary gear set with said third member of said third planetary gear set; or
      an engaged combination with said first brake selectively interconnecting said third member of said first planetary gear set with said transmission housing, said second brake selectively interconnecting said third member of said third planetary gear set with said transmission housing, said first clutch selectively interconnecting said second member of said first planetary gear set with said third member of said third planetary gear set, and said second clutch selectively interconnecting said third member of said second planetary gear set with said first member of said third planetary gear set; or
      an engaged combination with said first brake selectively interconnecting said third member of said second planetary gear set with said transmission housing, said second brake selectively interconnecting said third member of said third planetary gear set with said transmission housing, said first clutch selectively interconnecting said third member of said first planetary gear set with said second member of said second planetary gear set, and said second clutch selectively interconnecting said first member of said third planetary gear set with said third member of said third planetary gear set; or
      an engaged combination with said first brake selectively interconnecting said third member of said second planetary gear set with said transmission housing, said second brake selectively interconnecting said third member of said third planetary gear set with said transmission housing, said first clutch selectively interconnecting said third member of said first planetary gear set with said second member of said second planetary gear set, and said second clutch selectively interconnecting said second member of said third planetary gear set with said third member of said third planetary gear set; or
      an engaged combination with said first brake selectively interconnecting said first member of said first planetary gear set with said transmission housing, said second brake selectively interconnecting said third member of said second planetary gear set with said transmission housing, said first clutch selectively interconnecting said third member of said first planetary gear set with said second member of said third planetary gear set, and said second clutch selectively interconnecting said second member of said third planetary gear set with said third member of said third planetary gear set; or
      an engaged combination with said first brake selectively interconnecting said second member of said first planetary gear set with said transmission housing, said second brake selectively interconnecting said third member of said third planetary gear set with said transmission housing, said first clutch selectively interconnecting said third member of said first planetary gear set with said second member of said second planetary gear set, and said second clutch selectively interconnecting said first member of said second planetary gear set with said second member of said third planetary gear set; or an engaged combination with said first brake selectively interconnecting said second member of said second planetary gear set with said transmission housing, said second brake selectively interconnecting said third member of said third planetary gear set with said transmission housing, said first clutch selectively interconnecting said third member of said first planetary gear set with said third member of said third planetary gear set, and said second clutch selectively interconnecting said second member of said first planetary gear set with said third member of said third planetary gear set; or an engaged combination with said first brake selectively interconnecting said third member of said first planetary gear set with said transmission housing, said second brake selectively interconnecting said first member of said third planetary gear set with said transmission housing, said first clutch selectively interconnecting said third member of said first planetary gear set with said second member of said second planetary gear set, and said second clutch selectively interconnecting said second member of said second planetary gear set with said third member of said second planetary gear set; or an engaged combination with said first brake selectively interconnecting said second member of said first planetary gear set with said transmission housing, said second brake selectively interconnecting said third member of said third planetary gear set with said transmission housing, said first clutch selectively interconnecting said third member of said first planetary gear set with said second member of said second planetary gear set, and said second clutch selectively interconnecting said third member of said first planetary gear set with said third member of said third planetary gear set; or an engaged combination with said first brake selectively interconnecting said third member of said first planetary gear set with said transmission housing, said second brake selectively interconnecting said third member of said second planetary gear set with said transmission housing, said first clutch selectively interconnecting said first member of said first planetary gear set with said third member of said second planetary gear set, and second clutch selectively interconnecting said first member of said second planetary gear set with said third member of said third planetary gear set; or an engaged combination with said first brake selectively interconnecting said third member of said first planetary gear set with said transmission housing, said second brake selectively interconnecting said third member of said third planetary gear set with said transmission housing, said first clutch selectively interconnecting said second member of said first planetary gear set with said third member of said second planetary gear set, and said second clutch selectively interconnecting said first member of said third planetary gear set with said third member of said first planetary gear set; or an engaged combination with said first brake selectively interconnecting said third member of said first planetary gear set with said transmission housing, said second brake selectively interconnecting said third member of said third planetary gear set with said transmission housing, said first clutch selectively interconnecting said third member of said second planetary gear set with said second member of said first planetary gear set, and said second clutch selectively interconnecting said second member of said second planetary gear set with said third member of said third planetary gear set; or an engaged combination with said first brake selectively interconnecting said third member of said second planetary gear set with said transmission housing, said second brake selectively interconnecting said third member of said third planetary gear set with said transmission housing, said first clutch selectively interconnecting said second member of said first planetary gear set with said third member of said second planetary gear set, and said second clutch selectively interconnecting said first member of said third planetary gear set with said third member of said first planetary gear set; or an engaged combination with said first brake selectively interconnecting said third member of said first planetary gear set with said transmission housing, said second brake selectively interconnecting said third member of said third planetary gear set with said transmission housing, said first clutch selectively interconnecting said second member of said first planetary gear set with said third member of said second planetary gear set, and said second clutch selectively interconnecting said first member of said third planetary gear set with said first member of said first planetary gear set.

\* \* \* \* \*